US010897358B2

(12) United States Patent
Neumann

(10) Patent No.: US 10,897,358 B2
(45) Date of Patent: Jan. 19, 2021

(54) METHOD FOR MAPPING AT LEAST TWO AUTHENTICATION DEVICES TO A USER ACCOUNT USING AN AUTHENTICATION SERVER

(71) Applicant: ADUCID S.R.O., Brno-Prizrenice (CZ)

(72) Inventor: Libor Neumann, Luziny (CZ)

(73) Assignee: ADUCID S.R.O., Brno-Prizrenice (CZ)

( * ) Notice: Subject to any disclaimer, the term of this patent is extended or adjusted under 35 U.S.C. 154(b) by 206 days.

(21) Appl. No.: 15/737,708

(22) PCT Filed: Jul. 6, 2016

(86) PCT No.: PCT/CZ2016/050023
§ 371 (c)(1),
(2) Date: Dec. 18, 2017

(87) PCT Pub. No.: WO2017/005231
PCT Pub. Date: Jan. 12, 2017

(65) Prior Publication Data
US 2018/0198614 A1 Jul. 12, 2018

(30) Foreign Application Priority Data
Jul. 7, 2015 (CZ) .................................... 2015-471

(51) Int. Cl.
*H04L 9/32* (2006.01)
*H04W 12/06* (2009.01)
(Continued)

(52) U.S. Cl.
CPC .............. *H04L 9/321* (2013.01); *G06F 21/44* (2013.01); *H04L 9/12* (2013.01); *H04L 9/3215* (2013.01);
(Continued)

(58) Field of Classification Search
CPC ..... H04L 9/321; H04L 63/0853; H04L 63/04; H04L 9/12; H04L 9/3215;
(Continued)

(56) References Cited

U.S. PATENT DOCUMENTS 6,338,140 B1 * 1/2002 Owens .............. H04W 12/0609
713/168
8,255,981 B2 * 8/2012 Pearson .................. H04L 63/08
713/183
(Continued)

FOREIGN PATENT DOCUMENTS

EP 2469895 A1 6/2012

OTHER PUBLICATIONS

International Search Report and Written Opinion for PCT/CZ2016/050023 filed Jul. 6, 2016.

*Primary Examiner* — Abu S Sholeman
(74) *Attorney, Agent, or Firm* — Notaro, Michalos & Zaccaria P.C.

(57) ABSTRACT

The invention provides a method for mapping at least two authentication devices to a user account using an authentication server, where each authentication device connects to the authentication server using a secured communication channel; their mapping to the user account is recorded on the authentication server, and, when a transfer of data between the authentication devices mapped to the user account occurs, the data is passed over from the first authentication device to the authentication server using a secured communication channel and from the authentication server to another authentication device mapped to the account of said user using a secured communication channel, where the aforesaid secured communication channel is created by the second authentication device. This procedure allows the use of a single personal local authentication factor for multiple
(Continued)

authentication devices and increases the security of authentication of devices with authentication servers.

26 Claims, 5 Drawing Sheets

(51) Int. Cl.
*H04L 29/06* (2006.01)
*H04W 12/12* (2009.01)
*G06F 21/44* (2013.01)
*H04L 9/12* (2006.01)
*H04W 12/00* (2009.01)

(52) U.S. Cl.
CPC ............ *H04L 9/3231* (2013.01); *H04L 63/04* (2013.01); *H04L 63/08* (2013.01); *H04L 63/0853* (2013.01); *H04L 63/0892* (2013.01); *H04W 12/06* (2013.01); *H04W 12/1206* (2019.01); *H04L 63/0428* (2013.01); *H04L 2463/082* (2013.01); *H04W 12/00403* (2019.01)

(58) Field of Classification Search
CPC ........... H04L 2463/082; H04L 63/0428; H04L 63/0892; H04L 63/08; H04L 9/3231; G06F 21/44; H04W 12/00403; H04W 12/1206; H04W 12/06
See application file for complete search history.

(56) References Cited

U.S. PATENT DOCUMENTS

| | | | |
|---|---|---|---|
| 8,843,603 B1* | 9/2014 | Liu ..................... | G06F 9/44505 709/221 |
| 9,742,763 B2* | 8/2017 | Neuman ................. | H04L 63/20 |
| 10,050,942 B2* | 8/2018 | Kaladgi .............. | H04L 63/0838 |
| 2006/0137005 A1* | 6/2006 | Park .................. | H04L 29/12839 726/21 |
| 2012/0130902 A1* | 5/2012 | Dingler ................... | G06F 21/35 705/71 |
| 2013/0145449 A1* | 6/2013 | Busser .................... | G06F 21/31 726/7 |
| 2014/0019752 A1* | 1/2014 | Yin ..................... | H04L 63/0435 713/155 |
| 2014/0165165 A1* | 6/2014 | Story, Jr. ......... | H04W 12/04031 726/6 |
| 2014/0208404 A1* | 7/2014 | Brouwer ............... | H04L 63/062 726/6 |
| 2014/0281540 A1* | 9/2014 | Brouwer ............. | H04L 67/1042 713/169 |
| 2014/0289824 A1* | 9/2014 | Chan ........................ | G06F 9/54 726/5 |
| 2015/0067819 A1* | 3/2015 | Shribman ............... | H04L 67/32 726/12 |
| 2015/0143108 A1* | 5/2015 | Demeter .............. | H04L 9/0891 713/158 |
| 2015/0163295 A1* | 6/2015 | Shmilov ............. | H04L 65/1086 370/271 |
| 2017/0070524 A1* | 3/2017 | Bailey ............... | G06F 16/24578 |
| 2018/0097893 A1* | 4/2018 | Armstrong ............ | H04L 67/146 |

* cited by examiner

METHOD FOR MAPPING AT LEAST TWO AUTHENTICATION DEVICES TO A USER ACCOUNT USING AN AUTHENTICATION SERVER

FIELD OF ART

The invention relates to the field of security of information and communication technologies.

The invention concerns mapping at least two authentication devices to a user account using an authentication server in a secure way so as to ensure protection of means, in particular devices used for authentication of local or remote electronic communication, against abuse by an unauthorised person, and so as to ensure secure exchange and synchronization of sensitive information between authentication devices.

BACKGROUND ART

Means are known that are used for initializing secure protected electronic communication (authentication) which offer various levels of security, i.e. various levels of resistance against abuse by an unauthorised person.

Various methods addressing various manners of abuse are used in order to improve security.

Significant risks involving abuse of authentication means used in electronic communication include unauthorised obtaining of the authentication means and their use by an unauthorised person instead of an authorised person.

In case of use of authentication objects such as e.g. chip card or specialised authentication tokens or calculators, the attacker may obtain the authentication object for example by stealing it or otherwise obtaining it if the user loses the authentication object, and then use it instead of the authorized user. This is why the authentication object is often protected against abuse by some kind of a password, e.g. payment chip cards are protected using PIN.

If the user uses several authentication means (several devices for several servers), protection against abuse by another person (a so-called "second factor") is provided as an independent solution for each device. This leads to difficulties for the user, increased demands on knowledge and ability of the user, including his ability to memorise what to use and when. This makes the solutions more expensive, reduces their acceptability to the user and impairs the overall security.

The possibility of using multiple authentication appliances can, however, serve to significantly improve user comfort and security. When the user accesses the services of the providers from multiple devices and in different situations (from home, at work, while travelling), he may find it advantageous to use a variety of devices (personal computer, laptop, tablet, smart phone). If the user wants to be sure that the services of the providers remain available even under exceptional circumstances, e.g. when one of the devices malfunctions or is lost or stolen, he may find it advantageous to have also a backup authentication device available. In these cases, the current state of the art does not offer any user-friendly solutions for administration and protection of multiple authentication means.

DISCLOSURE OF THE INVENTION

The present invention provides a method for mapping at least two authentication devices to a user account using an authentication server, wherein each authentication device connects to the authentication server using a secured channel; their mapping to the account of said user is recorded on the authentication server, and, when a transfer of data between the authentication devices mapped to the account of said user is needed, the data is transmitted from the first authentication device to the authentication server using a secured communication channel, and then transmitted from the authentication server to another authentication device mapped to the same user account using a secured communication channel, when said secured communication channel is created by the second authentication device. Transmission of data between authentication devices may occur already during their mapping to the user account, but may also occur at any time afterwards, typically it occurs repeatedly—always when a change of data related to the account occurs or when authentication to the account occurs on one of the authentication devices. This method of transfer of data ensures that all authentication devices belonging to one user, or more precisely, mapped to his accounts on authentication servers, are in possession of the same information (relating to the account and to the authentication) and, if a change of information occurs on one of the authentication devices, the information is automatically changed on other authentication devices next time when these other authentication devices connect to the authentication server and obtain the data left on this server by the authentication device where the change occurred. These other authentication devices may connect at any time to the authentication server on which data were left for them by any authentication device mapped to the same user account; the connection is not forced by the server. On the next connection of each of the authentication devices to the authentication server, all the data left on this server by other authentication devices mapped to the same user account for this authentication device are transmitted to this authentication device.

One user can have multiple accounts on multiple authentication servers; preferably he has one user account on each authentication server, all his selected authentication devices are mapped to his user account according to the method of the invention.

These authentication devices transfer various synchronization information to each other as needed. Preferably, at least the sensitive information transferred between the authentication devices mapped to an account of one user is encrypted; more preferably, an authentication device secret (hereinafter ADS) shared by all the authentication devices belonging to the account of said user is used.

In a preferred embodiment, prior to or upon mapping of an authentication device to the user account on the authentication server, a first authentication device transmits the ADS to a second authentication device directly, without the authentication server being an intermediary, and the ADS is stored on the second authentication device. If this is the first mapping of another authentication device to the account of said user, the first authentication device generates and stores the ADS in its memory, and, at each following mapping of another authentication device, the stored ADS generated on the first mapping of another authentication device is transmitted, and the ADS is subsequently used for encryption at least the sensitive information within the data transferred between authentication devices mapped to the account of said user.

In a preferred embodiment, prior to or upon mapping of authentication devices to the user account on the authentication server, a first authentication device transmits a one-time secret to a second authentication device directly, without using the authentication server, and subsequently an ADS encrypted using the one-time secret is transmitted from the first authentication device to the authentication server using a secured communication channel and from the authentication server to the second authentication device, and after the decryption using the one-time secret, the ADS is stored on the second authentication device. If this is the first mapping of another authentication device to the account of said user, the first authentication device generates and stores the ADS in its memory, and at each following mapping of another authentication device, the stored ADS generated on the first mapping of another authentication device is transmitted, and the ADS is subsequently used for encryption at least the sensitive information within the data transferred between authentication devices mapped to the account of said user.

The authentication device is an electronic device which the user uses for authentication and for authenticated communication with the server. This can be a computer, a mobile phone, a tablet, a smartwatch, a chip card, etc. The authentication devices shall ensure a high level of certainty that there is no authentication device that would be undistinguishable from the user device by electronic means. The authentication devices shall support a secure method of creating or interconnecting other authentication devices of the same user while ensuring that the devices can be distinguished by electronic means.

The authentication server is a server with which the authentication device communicates; this can be e.g. a service provider's server.

The first authentication device is any authentication device which has already been mapped to the relevant user account. The second and each subsequent authentication device is any authentication device, which has not yet been mapped to this user account. Mapping of the second authentication device is carried out according to the method of the invention and it is hereinafter also referred to as "creating a replica". The second (hereinafter the term "second" shall mean the second or any subsequent) authentication device mapped to the user account is, from the perspective of the authentication server, a replica of the first authentication device and it shall hereinafter also be referred to as "replica".

A Personal Local Authentication Factor is a secret information held by the user. It can be in the form of information obtained by the authentication device directly from the user (password, PIN, face image recognition, fingerprint, gesture, etc.) or information stored in a medium (e.g. a card, chip, bracelet, smartwatch) or information obtained by the authentication device from the environment (information from a Wi-Fi network, QR code, wireless payment card, etc.). The form of the Personal Local Authentication Factor may also depend on the technology which the authentication device is capable of using (e.g. keyboard, multimedia-based input device, camera, chip reader, NFC, Bluetooth, USB, etc.).

The Personal Local Authentication Factor may utilise various technologies and thus influence the user characteristics and security parameters of the Personal Local Authentication Factor. Technical means of the authentication device must support the relevant Personal Local Authentication Factor technology, otherwise the Personal Local Authentication Factor would not be usable with such authentication device. In a preferred embodiment, these technical means ensure that processing of the Personal Local Authentication Factor occurs locally, i.e. over a short distance. Local communication (short-distance communication) is a communication which excludes the possibility of the communicating subjects disclosing information to third parties or the communication being intercepted.

The Personal Local Authentication Factor technology may potentially use other technical means, in addition to the technical means of the authentication device. These means can include for example means commonly used by the user personally for other purposes and carries it with him constantly or very often. For example, such means may include electronic watch using Bluetooth communication, sports electronic wristband or other "wearable" electronics using Bluetooth communication, electronic identification documents using NFC communication, such as electronic passport or pre-paid electronic ticket using NFC-compatible chip, or NFC-compatible payment card.

Some Personal Local Authentication Factor technologies may also require other data for their proper functioning, wherein this data must be available on the authentication device while using the Personal Local Authentication Factor. Such Personal Local Authentication Factor means must be synchronised between the authentication devices in order to ensure the same function of the Personal Local Authentication Factor on all authentication devices belonging to the same user. Examples of means of the Personal Local Authentication Factor include pictures and secret information of multimedia-based input device or biometric reference information of biometric sensors.

Synchronization data include data needed for the use of the Personal Local Authentication Factor, but they may also include additional information relating to the user, e.g. identifiers for the purposes of verification of ownership of electronic ID card, passport or other documents, or private keys needed for electronic signature, etc.

At the moment of mapping the second (i.e. the second and each subsequent) authentication device, the first authentication device may already contain Personal Local Authentication Factor data needed for authentication of the authentication device with the authentication server, or alternatively, it may not yet contain such data. The authentication device replica may be created at any time, for example before the creation of the Personal Local Authentication Factor or after the creation of the Personal Local Authentication Factor. In a preferred embodiment, if this is the first mapping of another authentication device to the user account (i.e. if this is the first creation of the replica), the first authentication device generates the ADS. ADS can be generated by the first authentication device randomly or using any suitable information, preferably an one-time created information. In each subsequent mapping of another authentication device to the same user account (i.e. each time another replica is created), the ADS created in the first transaction is transmitted. This ensures that all authentication devices mapped to the account of said user possess the same ADS. Direct transmission of this ADS between authentication devices ensures that the ADS is known only to the authentication devices which have been mapped to the same user account, and that it is not known by other devices or the authentication servers. ADS can be transferred between authentication devices e.g. using close contact technologies such as NFC, Bluetooth, QR code, etc. This preferred embodiment thus improves the security of data transferred subsequently between authentication devices using the authentication servers.

If a Personal Local Authentication Factor has already been created on the first authentication device at the time of creation of the replica, then, during mapping of the second authentication device to the relevant user account, synchronization data is prepared on the first authentication device, where the Personal Local Authentication Factor has already been created, from a set of information needed for authentication with an authentication server (if ADS has been created, then at least the sensitive information can be encrypted using the ADS). A secured communication channel via the authentication server is created between the first and the second authentication device and subsequently the synchronization data is transmitted through this secured communication channel from the first authentication device to the authentication server, and then from the authentication server to the second authentication device (if the data has been encrypted using ADS, then the second authentication device decrypts the synchronization data using the ADS).

Methods of creating synchronization data are known in the art and depend on the Personal Local Authentication Factor technologies used and the methods of authentication of the Personal Local Authentication Factor.

If a Personal Local Authentication Factor has not yet been created on the first authentication device at the time of creation of the replica, when Personal Local Authentication Factor is created in the first authentication device, then synchronization data is prepared from a set of information needed for authentication of the Personal Local Authentication Factor in the first authentication device (if ADS has been created, then at least the sensitive information can be encrypted using the ADS). Then, a secured communication channel is created between the first authentication device and the authentication server, the synchronization data is transmitted through this secured communication channel from the first authentication device to the authentication server, the synchronization data on the authentication server are queued in a synchronization queue for all the other authentication devices mapped to the same user account, and, after login of any such other authentication device, a secured communication channel is created between this another authentication device and the authentication server and the contents of the synchronization queue is transferred to this other authentication device (if the data has been encrypted using ADS, then the other authentication device decrypts the synchronization data using the ADS).

Synchronization includes a complex of activities of authentication devices and authentication servers used for transfer of the necessary information between the authentication devices mapped to the account of one user. The goal of synchronization is to ensure correct and secure functionality of the Personal Local Authentication Factor in all these authentication devices. Security risks in synchronization are reduced by using ADS (which is transferred only directly between authentication devices, not via authentication servers) to encrypt data.

For example, the following tools can be used for synchronization:

Synchronization Tool 1—Authentication Server Synchronization Queue

Synchronization messages containing synchronization data from one authentication device mapped to a given user account and timestamped by the authentication device are received by the authentication server. Authentication server finds all authentication device replicas, i.e. all authentication devices mapped to the same user account. The received synchronization messages are timestamped by the authentication server with the time of receipt as per the authentication server time and the authentication server copies the synchronization messages into queues on the authentication server for all the authentication devices mapped to the same user account (with the exception of the authentication device from which the server received the synchronization messages). Once the specific authentication device being the target of a given synchronization queue connects and is authenticated, all the queued synchronization messages are transferred to this authentication device. After the authentication device confirms the receipt, all the transferred messages are deleted from the queue. Timestamps of the authentication device are used to group the individual parts of the data set and to distinguish and potentially exclude duplicate synchronization via different authentication servers.

Synchronization Tool 2—Broadcast of the Synchronization by the Authentication Device An authentication device activates a secured communication channel with an authentication server appearing on a list of authentication servers on which said authentication device is mapped to a given user account. Synchronization messages are transferred via this communication channel to the authentication server, where they are received and processed by the authentication server synchronization queue.

Synchronization Tool 3—Personal Local Factor Verification as a Frontend Task

Personal Local Authentication Factor verification as a frontend task is used if there is an existing user-activated secured communication channel between the authentication device and the authentication server at the moment of verification, and such a channel is used to verify the Personal Local Authentication Factor. The Personal Local Authentication Factor entered by the user or obtained from the outer environment or from a medium is verified by the authentication server. The result of the verification is transferred back to the authentication device. The transfer is made using a user-activated secured communication channel between the authentication device and the authentication server.

Synchronization Tool 4—Automatic Personal Local Factor Verification as a Background Task Personal Local Authentication Factor verification as a background task means verification with the authentication server, if there is no existing user-activated secured communication channel between the authentication device and the given authentication server at the moment of request for verification. The Personal Local Authentication Factor verification as a background task may be carried out with any authentication server where the Personal Local Authentication Factor has been created. The Personal Local Authentication Factor verification as a background task may also be used if there is an existing user-activated secured communication channel between the authentication device and any authentication server. During verification as a background task, the authentication device automatically activates, on the basis of a list of authentication servers, an authentication of the authentication device and the creation of a secured communication channel to one of the authentication servers from the list. The Personal Local Authentication Factor obtained either in parallel frontend authentication, or on the basis of being entered by the user or obtained from the outer environment, or from a medium is verified by the authentication server within verification as a background task. For the purpose of background verification of the Personal Local Authentication Factor, the list of authentication servers includes all authentication servers, where the Personal Local Authentication Factor has been created prior to the moment of verification. It is possible to use another authentication server from the list in case of communication difficulties or other difficulties during activation or during the course of the authentication of the authentication device with a specific authentication server.

The method according to the present invention further allows authentication of communication with another authentication server using the same Personal Local Authentication Factor so that within the first authentication transaction with this another authentication server, verification of accuracy of the entered Personal Local Authentication Factor with any authentication server where this Personal Local Authentication Factor for authentication has already been created is carried out first. This first authentication transaction can be carried out at any time by any authentication device mapped to the given user account (i.e. by any replica). Verification of accuracy of the entered Personal Local Authentication Factor is preferably carried out using the Synchronization tool 4—Automatic personal local factor verification as a background task.

Following the first authentication of communication with another authentication server, the authentication device prepares synchronization data for the set of information needed for authentication with this other authentication server, where at least the sensitive information is preferably encrypted using ADS. These synchronization data are transmitted via secured communication channels to all authentication servers where this authentication device is mapped to the given user account into synchronization queues for all authentication devices mapped to the same user account, and after login of any such authentication device, a secured communication channel is created between this authentication device and the authentication server and the contents of the synchronization queue is transferred to this authentication device where it is preferably decrypted using ADS.

If the Personal Local Authentication Factor is changed from an original Personal Local Authentication Factor to a new Personal Local Authentication Factor, this change is carried out on one of the authentication devices in a way that this authentication device verifies the entered value of the original Personal Local Authentication Factor with at least one authentication server where the Personal Local Authentication Factor has been created (preferably using the Synchronization tool 4—Automatic personal local authentication factor verification as a background task), and this authentication device creates synchronization data, where at least the sensitive information is preferably encrypted using the ADS, and these synchronization data are transferred via secured communication channel to all authentication servers where this authentication device is mapped to the user account. Then, the synchronization data are transferred from authentication servers via secured communication channels to each of the other authentication devices mapped to the same user account and the other authentication devices preferably decrypt the synchronization data using ADS. This synchronization makes use of the synchronization queues.

If a second (here, the term "second" means "second and each subsequent") authentication device where a Personal Local Authentication Factor different from the Personal Local Authentication Factor created on the first authentication device is being mapped to the same user account, and if it is required that both authentication devices use the same Personal Local Authentication Factor after mapping, then, after synchronization data are transferred from the first authentication device to the second authentication device, the entered values of each Personal Local Authentication Factor are first verified by the second authentication device with at least one authentication server where the given Personal Local Authentication Factor has been created, using the set of information needed for authentication with the authentication server, and in case of a positive result of this verification, the original Personal Local Authentication Factor of the second authentication device is replaced by the Personal Local Authentication Factor transferred from the first authentication device.

Merger of a plurality of Personal Local Authentication Factors created in a plurality of authentication devices, which have already been mapped to the same user account, into one Personal Local Authentication Factor takes place as follows: in an authentication device which contains both the Personal Local Authentication Factor which is to serve as the final Personal Local Authentication Factor, and the merged Personal Local Authentication Factor which will cease to exist after the merger, entered value of each of the Personal Local Authentication Factors is first verified with at least one authentication server where the given Personal Local Authentication Factor has been created (preferably, the Synchronization tool 4—Automatic personal factor verification as a background task can be used), and if the result of the verification is positive for both Personal Local Authentication Factors, synchronization data for the final Personal Local Authentication Factor is created on the authentication device, where at least the sensitive information is preferably encrypted using the ADS, and these synchronization data are transferred via secured communicational channels to all authentication servers where the authentication device is mapped to the user account, and the synchronization data are subsequently transferred from the authentication servers via secured authentication channels to every other authentication device which is mapped to the same user account, whereas the authentication device preferably decrypts the synchronization data using the ADS. This synchronization makes use of the synchronization queues.

If a request is made to delete the Personal Local Authentication Factor, the authentication device where the request for deletion of the Personal Local Authentication Factor was made deletes the Personal Local Authentication Factor and prepares synchronization data containing information about the request for deletion of the Personal Local Authentication Factor and transmits it to all authentication servers where this authentication device is mapped to the user account, and these servers enter said data in a synchronization queue for all other authentication devices mapped to the user account. Subsequently, following the receipt of the synchronization data, a confirmation of the request is requested on all other authentication devices, and only after the confirmation of the request for deletion of the Personal Local Authentication Factor is the Personal Local Authentication Factor deleted on this other authentication device; in case the request for deletion of the Personal Local Authentication Factor is declined, the Personal Local Authentication Factor is verified on this other authentication device, the Personal Local Authentication Factor is not deleted, and the authentication device where the request for deletion of the Personal Local Authentication Factor was made is blocked. This ensures protection against abuse of the user account and against deletion of the Personal Local Authentication Factor by an attacker who has stolen one or more of the user's authentication devices. The Personal Local Authentication Factor on these authentication devices is deleted as per the instruction of the attacker, but additionally the access to the user account using these authentication devices is blocked. At the same time, devices remaining in the authorised user's possession can continue operating, using the same Personal Local Authentication Factor. If the Personal Local Authentication Factor is being deleted by the authorised user, this system allows for deletion of Personal Local Authentication Factors in authentication devices without blocking any of them, simply by means of confirmation of the request for deletion of the Personal Local Authentication Factor.

In one preferred embodiment, the user behaviour is assessed with each use of the Personal Local Authentication Factor by any authentication device, preferably on the basis of success or failure in entering the Personal Local Authentication Factor in the individual devices.

One option for assessment of the behaviour of the user of the Personal Local Authentication Factor is an adaptive lock. The adaptive lock represents a method of protection of the Personal Local Authentication Factor against an attacker who has obtained one or more user authentication devices, especially against a brute-force attack (repeated attempts to check multiple combinations). On each authentication device, the adaptive lock counts all unsuccessful attempts to enter the Personal Local Authentication Factor, regardless of on which authentication server the Personal Local Authentication Factor was used. Therefore, all the incorrect attempts to enter (input) the Personal Local Authentication Factor from the given authentication device are counted. When a number of incorrect inputs of the Personal Local Authentication Factor pre-set on an authentication server is reached on this authentication server, the authentication server then blocks access to the user account from this authentication device on this authentication server. The number of incorrect inputs may mean e.g. an absolute number of incorrect inputs, or a number of incorrect inputs per unit of time, or a ratio of the number of incorrect inputs to the number of correct inputs (again, either in the form of an absolute number or a number per unit of time). A different number of incorrect inputs may be pre-set on each authentication server, upon reaching whereof the access of the authentication device to the user account is blocked, which means that when the number of incorrect inputs triggering the blocking of one authentication server is reached, not all authentication servers must necessarily be blocked.

Another option consists in recognizing a different user behaviour between various authentication devices. This method offers protection when the attacker has obtained only some of the user devices, e.g. just one, and the user still has access to at least one of his authentication devices. The authentication server evaluates the incorrect inputs (an incorrect input means, e.g., an absolute number of incorrect inputs, or a number of incorrect inputs per unit of time, or a ratio of the number of incorrect inputs) to the number of correct inputs (again, either in the form of an absolute number or a number per unit of time) for various authentication devices, and if the criterion of different behaviour (e.g. the number of incorrect inputs on one authentication device as compared to the number of correct inputs on another authentication device in the same period), the access of the relevant authentication device to the user account is blocked.

In a further preferred embodiment, the Personal Local Authentication Factor is created within an initiating authentication transaction, primary authentication between the authentication device and the authentication server is carried out first, during the course of which a secret information is created, e.g. a secondary authentication secret created during the primary authentication within this transaction, whereas this secret information is shared only by the authentication device and the authentication server and valid only for the initiating authentication transaction, and a reference information is derived from this secret information using the same method on the authentication server and on the authentication device, and the authentication device creates a transformed reference information from the reference information by means of a cryptographic transformation using the Personal Local Authentication Factor chosen and entered by the user or obtained from a medium or from the outer environment. Only the reference information is stored on the authentication server and only the transformed reference information is stored on the authentication device. In each subsequent authentication transaction using the created Personal Local Authentication Factor, the authentication device obtains the Personal Local Authentication Factor from the user, the medium or the outer environment; in the authentication device, the reference information is derived from the transformed reference information by means of inverse cryptographic transformation using the obtained local factor, and the reference information is transmitted to the authentication server; this preferably takes place in the form of a derived information obtained through application of one-way cryptographic transformation using authenticated random information shared by the authentication device and the authentication server and valid only for the given authentication transaction (such authenticated random information may be for example the secondary authentication secret created during the primary authentication within this transaction) on the reference information. Subsequently, the authentication server compares the transmitted reference information with the reference information stored on the server, or alternatively, the derived information is compared with information derived from the stored reference information using the same method by the authentication server.

The initiating authentication transaction is a transaction where the user chooses the Personal Local Authentication Factor, i.e. its technology and value. The initiating authentication transaction may also be called the creation of the Personal Local Authentication Factor.

Primary authentication is the first step of any authentication transaction where the authentication device and the authentication server authenticate each other (e.g. using public and private keys). During primary authentication, a secondary authentication secret is created, which is an authenticated information shared by the authentication device and the authentication server and which is valid only for the current authentication transaction.

The reference information is information created during the initiating authentication transaction, which is not derived from the Personal Local Authentication Factor; it is not related to it. It is preferably derived from a randomly generated secondary authentication secret during the initiating authentication transaction. The reference information is stored on the authentication server, not on the authentication device.

The transformed reference information is a product of cryptographic operation carried out on the reference information by the authentication device and using the Personal Local Authentication Factor as a parameter. However, the transformed reference information is not derived from the Personal Local Authentication Factor, nor can the Personal Local Authentication Factor be obtained from it. The transformed reference information is stored on the authentication device and it is not stored on the authentication server.

The described preferred embodiment allows for the creation of the Personal Local Authentication Factor and its use in subsequent authentication transactions without the need for storing the Personal Local Authentication Factor or any other information from which the Personal Local Authentication Factor could be obtained on the authentication device or on the authentication server. This significantly increases the security of the authentication against an attack aimed at obtaining the Personal Local Authentication Factor, since even if the attacker obtains the reference information from the server or the transformed reference information from the authentication device, this information does not include any information derived from the Personal Local Authentication Factor that could lead to the Personal Local Authentication Factor or that could allow to obtain the Personal Local Authentication Factor.

The Personal Local Authentication Factor is merely a parameter used by the cryptographic transformation during derivation (encryption) of the transformed reference information from the reference information and vice-versa during the derivation (decryption) of the reference information from the transformed reference information. Without the Personal Local Authentication Factor being obtained by the authentication device, i.e. without it being entered by the user or obtained from the outer environment or from a medium, the cryptographic transformation cannot correctly derive the reference information.

DETAILED DESCRIPTION OF THE INVENTION

During the life cycle of the system of authentication devices mapped to a user account, and during the life cycle of the Personal Local Authentication Factor used by these authentication devices to authenticate access to the user account, certain situations may occur and the specific embodiments in these situations are discussed in this section in detail.

Methods of Synchronization

The methods of synchronization depend on the stage of the Personal Local Authentication Factor life cycle and on creation and connection of authentication devices mapped to the given user account (replication). The synchronization uses the synchronization tools described above.

Replication Without Personal Local Authentication Factor

If the user creates and maps another authentication device to hisuser account, whereas Personal Local Authentication Factor has not yet been created on the authentication devices, preparation of authentication devices for future potential synchronization after replication occurs. Encrypted transfer of the ADS intended for (future) protection of the synchronization sensitive information is one of the parts of the synchronization. The ADS is transferred from the source (first) authentication device to the target (second) authentication device. In the event of the first replication, the ADS is generated by the source authentication device. Preferably, the ADS is encrypted for transfer using a one-time secret so that the confidentiality of the transfer of the secret between the authentication devices over the whole route of the transfer is ensured.

The ADS synchronization occurs between the replicated authentication devices (from the source to the target device) during the replication process. Later synchronization is carried out via a service provider's server.

Replication Using Personal Local Authentication Factor

In the event that the user is creating and mapping to a user account another authentication device belonging to the same user, where one or more Personal Local Authentication Factors have already been created on the source (first) device (one or more Personal Local Authentication Factors may also exist on the target (second) device), preparation of the authentication devices for future potential synchronization occurs in the same way as in the case of replication without Personal Local Authentication Factor. Additionally, verification of the Personal Local Authentication Factor and synchronization of all existing Personal Local Authentication Factors also occurs.

Verification of each Personal Local Authentication Factor is carried out on at least one authentication device.

In case technological means allow to verify the Personal Local Authentication Factor on the first authentication device, i.e. on the authentication device from which the Personal Local Authentication Factor is being transferred, the possibility to use the Personal Local Authentication Factor may be verified by checking the adaptive lock, then the Personal Local Authentication Factor is verified, and if the verification is successful, the synchronization is carried out.

In case technological means do not allow verification of the Personal Local Authentication Factor on the first authentication device, the synchronization is carried out first, and then the possibility of using verification of the Personal Local Authentication Factor by assessing the synchronised adaptive lock of the source (first) authentication device is checked, and then the Personal Local Authentication Factor is verified on the target (second) authentication device, i.e. on the authentication device to which the Personal Local Authentication Factor was transferred; if the verification is successful, the synchronization is confirmed and concluded successfully. In the event of failure to verify the Personal Local Authentication Factor on the target authentication device or in case of unsuccessful verification, synchronization is deleted and both authentication devices are returned to the previous state, and the unsuccessful use of the Personal Local Authentication Factor can be recorded for future assessment of the adaptive lock.

Each Personal Local Authentication Factor is synchronised independently of others.

The synchronization of the Personal Local Authentication Factor contains information shared between all the service providers for whom the Personal Local Authentication Factor was created, as well as information specific for each individual service provider. Sensitive information is preferably encrypted using the ADS intended for protection of synchronised sensitive information.

The synchronization occurs only between replicated authentication devices (from the source to the target device) during the replication process. The synchronization is carried out via the service provider's server.

Replication With Merging of Personal Local Authentication Factors

If a different Personal Local Authentication Factor exists on the target (second) authentication device than on the source (first) authentication device, a replication using Personal Local Authentication Factor (according to the description above) is carried out; additionally, the process of merging the Personal Local Authentication Factors is carried out.

The process of merging the Personal Local Authentication Factors is initiated at the end of the synchronization, i.e. after the successful verification of the Personal Local Authentication Factor on the target authentication device.

The user may be offered the possibility of merging the Personal Local Authentication Factors or the merging may be forced.

If merging is chosen by the user or forced, verification of both merged Personal Local Authentication Factors is carried out. In case of successful verification of both merged Personal Local Authentication Factors, the original Personal Local Authentication Factor formerly existing on the target authentication device is changed into the synchronised Personal Local Authentication Factor, i.e. the Personal Local Authentication Factor formerly existing on the source authentication device.

Synchronization Before Replication

If no replication of the authentication device has been carried out yet, all the Personal Local Authentication Factor life-cycle actions are carried out without synchronization.

If the replication was carried out at least once for at least one authentication server, the appropriate synchronization after replication is always carried out, also in case the appropriate personal factor life-cycle action is carried out on a different authentication server than the one where the replication was carried out.

Creation of Personal Local Authentication Factor for the First Service Provider, Carried Out After Replication Personal Local Authentication Factor is created when authenticated connection via a secured communication channel exists between the authentication device and the authentication server. The connection of other authentication devices of the same user to the same authentication server or to other authentication servers is not necessary at this point in time.

If the user creates a Personal Local Authentication Factor for the first authentication server, i.e. for the first service provider, and a replication of the authentication device was carried out at least once (independently of whether the authentication device served as the source or target authentication device during replication), the synchronization of the created Personal Local Authentication Factor occurs via the authentication server with respect to all authentication device replicas using the following procedure.

The newly created Personal Local Authentication Factor is not verified in any way. The user may enter any Personal Local Authentication Factor.

A data set containing unique identifier of the Personal Local Authentication Factor and other technical and user data is attached to the Personal Local Authentication Factor upon its creation. This may be for example user help, technological identifier, pictures of keyboard icons, keyboard secret data, encrypted authentication secret, authentication server identifier or authentication server address.

The new Personal Local Authentication Factor entered by the user may be used also to decrypt the reference information of the Personal Local Authentication Factor pertinent to the authentication server.

The data set is timestamped by the authentication device and, after appropriate encryption, transferred to the authentication server.

On the authentication server, the data set is passed into synchronization queues of all the other authentication device replicas belonging to the same user (mapped to the same user account) if such replicas were created on the authentication server. Simultaneously, the data set is timestamped by the authentication server.

The data set waits in the synchronization queue for connection of the authentication device pertaining to the given queue.

At the moment of connection of the authentication device, following its authentication, the contents of the queue are transferred to the authentication device, where they are processed according to the timestamps, in the order according to the authentication server timestamps.

Timestamps of the authentication device are used to group the individual parts of the data set and to distinguish and potentially exclude duplicate synchronization via different authentication servers.

Creation of Personal Local Authentication Factor for Another Service Provider After Replication When a Personal Local Authentication Factor is to be created for a second or subsequent authentication server, i.e. a Personal Local Authentication Factor has already been created for at least one (first) authentication server, independently of whether this occurred before or after replication, and a replication of the authentication device has been carried out at least once, the synchronization of the created Personal Local Authentication Factor occurs via the authentication server with respect to all authentication device replicas using the following procedure.

The user-entered Personal Local Authentication Factor is verified.

In case of a positive result, the data set pertaining to the Personal Local Authentication Factor is extended to include data concerning the another authentication server, including e.g. encrypted authentication secret pertaining to the authentication server.

The user-entered and verified Personal Local Authentication Factor may be used to encrypt the reference information of the Personal Local Authentication Factor pertinent to the authentication server.

The data set is timestamped by the authentication device and, after appropriate encryption, it is transferred to all authentication servers where the Personal Local Authentication Factor has been created by that time.

On all the authentication servers, the data set is passed into synchronization queues of all the other authentication device replicas belonging to the same user if such replicas were created on the relevant authentication server. Simultaneously, the data set is timestamped by the authentication server.

The data set waits in the synchronization queue for connection of the authentication device pertaining to the given queue to the relevant authentication server.

At the moment of connection of the authentication device, following its authentication, the contents of the queue are transferred to the authentication device, where they are processed according to the timestamps, in the order according to the authentication server timestamps.

Timestamps of the authentication device are used to group the individual parts of the data set and to distinguish and potentially exclude duplicate synchronization via different authentication servers.

Change of Personal Local Authentication Factor After Replication

A change of the Personal Local Authentication Factor is carried out at a time when there is no existing authenticated connection between the authentication device and any authentication server via a secured communication channel. The connection of other authentication devices of the same user to the same authentication server or to other authentication servers is not necessary at this point in time.

The authentication device checks an adaptive lock of the original Personal Local Authentication Factor. The user enters a new Personal Local Authentication Factor including the specification of the Personal Local Authentication Factor technology and potentially also the Personal Local Authentication Factor technology means. The user also uses the original Personal Local Authentication Factor. The authentication device verifies the accuracy of the entered original Personal Local Authentication Factor using the Synchronization tool 4—Automatic personal factor verification as a background task.

In case of failure, the authentication device updates the adaptive lock and declines to change the Personal Local Authentication Factor.

In case of success, the authentication device processes the data of the new Personal Local Authentication Factor and the original Personal Local Authentication Factor and the results are logged in internal data records of the authentication device, as well as in the contents of the synchronization data. The authentication device timestamps the synchronization data and transmits them to all authentication servers where the original Personal Local Authentication Factor was created using Synchronization tool 2—Broadcast of the synchronization of the authentication device.

Each authentication server puts the received synchronization data into queues using Synchronization tool 1—Authentication server synchronization queue.

At the moment of connection of a different authentication device to one of the authentication servers and after its authentication, the contents of the queue are transferred to the authentication device, wherein they are processed according to the timestamps, in the order according to the authentication server timestamps. Timestamps of the authentication device are used to group the individual parts of the data set and to distinguish and potentially exclude duplicate synchronization via different authentication servers.

In this way, a change of the Personal Local Authentication Factor is carried out also on the other authentication devices.

Merging Personal Local Authentication Factors After Replication

Personal Local Authentication Factors are merged after replication is carried out, at a time when there may not be any authenticated connection via a secured communication channel between the authentication device and any authentication server. The connection of other authentication devices of the same user to the same authentication server or to other authentication servers is not necessary at this point in time.

The authentication device checks the adaptive lock of both Personal Local Authentication Factors being merged. The user uses the target Personal Local Authentication Factor and also uses the Personal Local Authentication Factor being merged. The authentication device verifies the accuracy of both the entered Personal Local Authentication Factors using the Synchronization tool 4—Automatic personal factor verification as a background task.

In case of failure, the authentication device updates the adaptive lock and declines to merge the Personal Local Authentication Factors.

In case of success, the authentication device processes the data of the target and also the merged Personal Local Authentication Factor and the results are logged in internal data records of the authentication device, as well as in the content of the synchronization data.

The authentication device timestamps the synchronization data and transmits them to all authentication servers where the target and/or merged Personal Local Authentication Factor was created, using Synchronization Tool 2—Broadcast of the Synchronization of the Authentication Device.

Each authentication server puts the received synchronization data into respective queues using Synchronization tool 1—Authentication server synchronization queue.

At the moment of connection of a different authentication device to one of the authentication servers and after its authentication, the content of the queue are transmitted to the authentication device, where they are processed according to the timestamps, in the order according to the authentication server timestamps. Timestamps of the authentication device are used to group the individual parts of the data set and to distinguish and potentially exclude duplicate synchronization via different authentication servers.

In this way, Personal Local Authentication Factors are merged also on the other authentication device.

Deleting Personal Local Authentication Factor After Replication

Personal Local Authentication Factor is deleted at a time when there may not be any authenticated connection via a secured communication channel between the authentication device and any authentication server. The connection of other authentication devices of the same user to the same authentication server or to other authentication servers is not necessary at this point in time.

A Personal Local Authentication Factor or verification of the accuracy of the Personal Local Authentication Factor need not be used during deletion of the Personal Local Authentication Factor. The authentication device deletes the relevant data of the deleted Personal Local Authentication Factor from the internal records of the authentication device and prepares synchronization data for deletion of the Personal Local Authentication Factor.

The authentication device timestamps the synchronization data and transmits them to all authentication servers where the deleted Personal Local Authentication Factor was created using Synchronization Tool 2—Broadcast of the Synchronization of the Authentication Device.

Each authentication server puts the received synchronization data into queues using Synchronization tool 1—Authentication server synchronization queue.

Simultaneously, the authentication server flags the internal data of the other authentication devices of the same user used to assess the Personal Local Authentication Factor with the flag of deletion by one of the authentication devices and keeps the internal data.

At the moment of connection of a different authentication device to one of the authentication servers and after its authentication, the contents of the queue are transmitted to the authentication device, wherein they are processed according to the timestamps, in the order according to the authentication server timestamps. Timestamps of the authentication device are used to group the individual parts of the data set and to distinguish and potentially exclude duplicate synchronization via different authentication servers.

During processing of the synchronization data for deletion of the Personal Local Authentication Factor, the second authentication device requests user confirmation of the deletion.

In the event the user confirms the deletion, the authentication device deletes the relevant data of the deleted Personal Local Authentication Factor from the internal records of the authentication device and prepares synchronization messages about deletion of the Personal Local Authentication Factor.

The authentication device passes over the synchronization data of confirmation of deletion of the Personal Local Authentication Factor to all authentication servers, where the deleted Personal Local Authentication Factor has been created.

Declined Deletion of Personal Local Authentication Factor After Replication

In the event the user declines the deletion, the authentication device requests the use of the Personal Local Authentication Factor. The authentication device verifies the accuracy of the entered Personal Local Authentication Factor using the Synchronization tool 4—Automatic personal factor verification as a background task. The goal of the confirmation is to verify whether the authentication device is in the hands of the authorised user and whether he wishes to keep the Personal Local Authentication Factor. If this is confirmed, the authentication device prepares synchronization data of the declined deletion of the Personal Local Authentication Factor.

The authentication device transmits the synchronization data of the declined deletion of the local factor to all authentication servers, where the deleted Personal Local Authentication Factor has been created.

While processing the synchronization data of the declined deletion of the local factor, the authentication server automatically carries out the action intended for this case. For example, a blocking flag may be set, deactivating the authentication device where the declined deletion of the Personal Local Authentication Factor was requested.

Simultaneously, the authentication server changes the flag of deletion by one of the authentication devices in the internal data used to assess the Personal Local Authentication Factor of the other authentication devices of the same user, except the authentication device where the declined deletion of the Personal Local Authentication Factor was requested. This allows further use of the Personal Local Authentication Factor.

Recognition of Different Behaviour of Unauthorized User

Recognition of different behaviour of an unauthorized user is carried out during each use of the Personal Local Authentication Factor by any authentication device, if the Personal Local Authentication Factor is verified by this authentication server.

The authentication server keeps records of unsuccessful and successful uses of the local factor, including the timestamp for each of the authentication devices separately.

In recognition, records of the use of the Personal Local Authentication Factor by all the replicas of the assessed authentication device are checked. When the result of the assessment is that the criterion of different behaviour of an unauthorised user was met—e.g. the number of unsuccessful uses of the Personal Local Authentication Factor exceeded a pre-set limit in one authentication device during a time interval in which the number of successful uses of the Personal Local Authentication Factor on a different authentication device of the same user was above a pre-set limit—, an action intended for this case is automatically initiated.

For example, a blocking flag may be set, deactivating the authentication device where the limit set for unsuccessful uses of the Personal Local Authentication Factor was exceeded.

EXAMPLES OF INVENTION EMBODIMENT

Example 1

Figure 1:
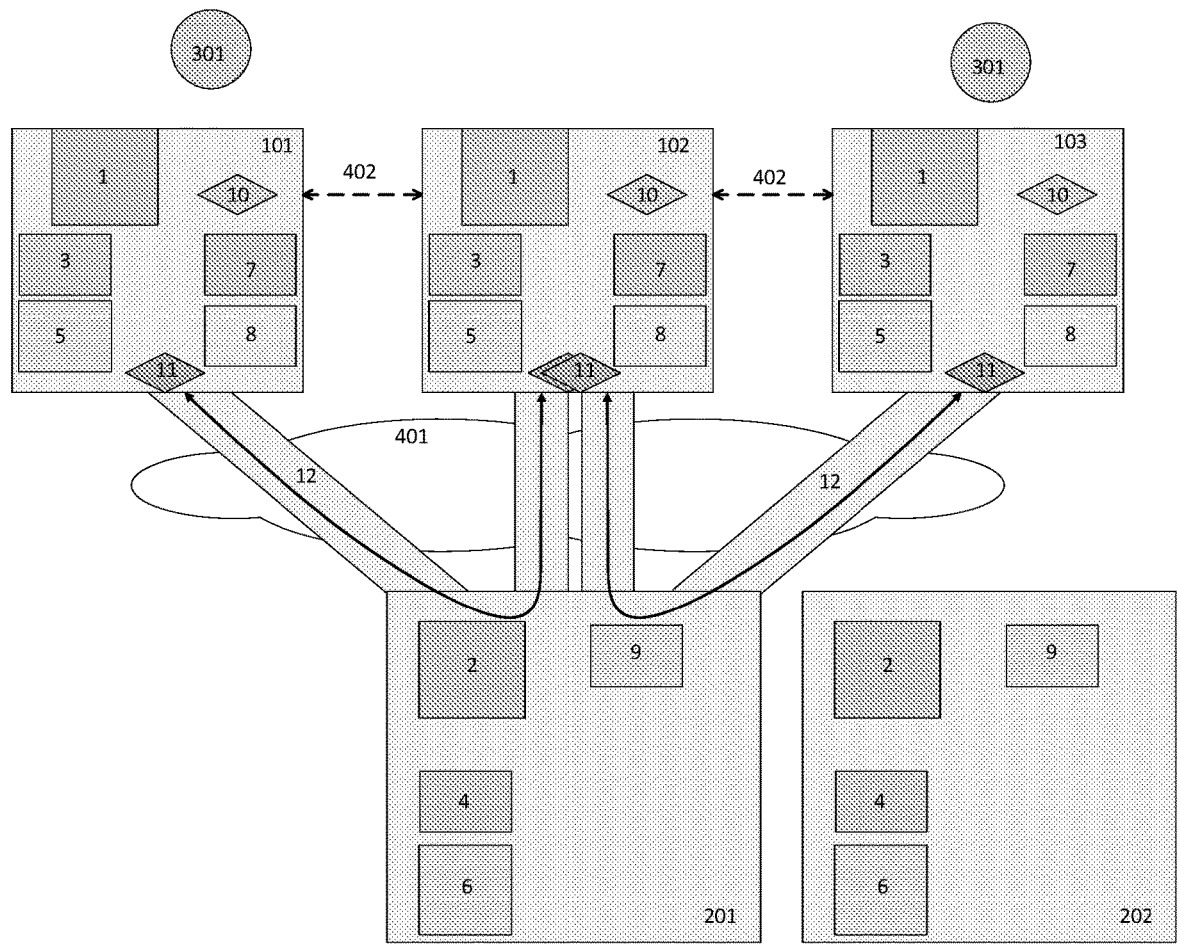
FIG. 1 is a schematic depiction of the system according to example 1.
Figure 2:
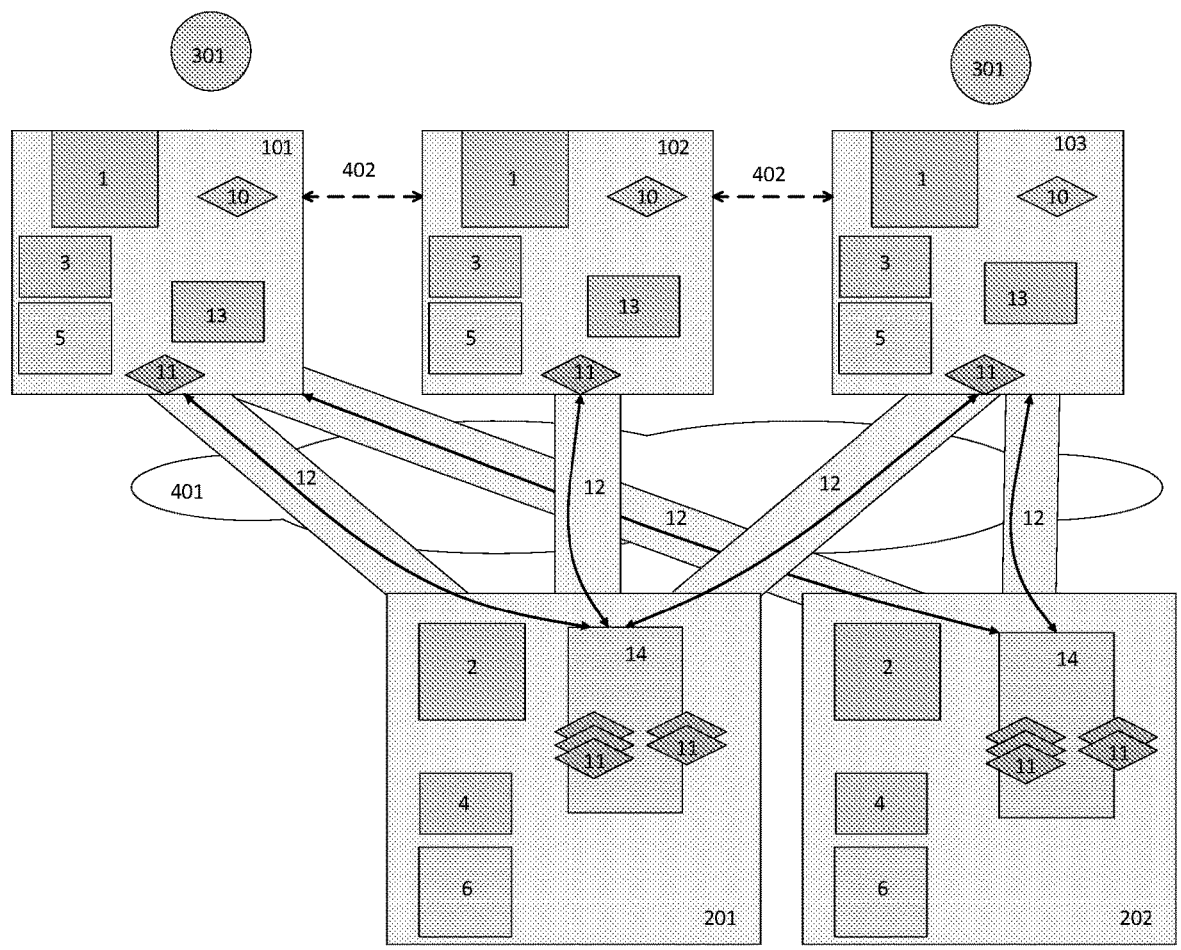
FIG. 2 is a schematic depiction of the system according to example 2.
Figure 3:
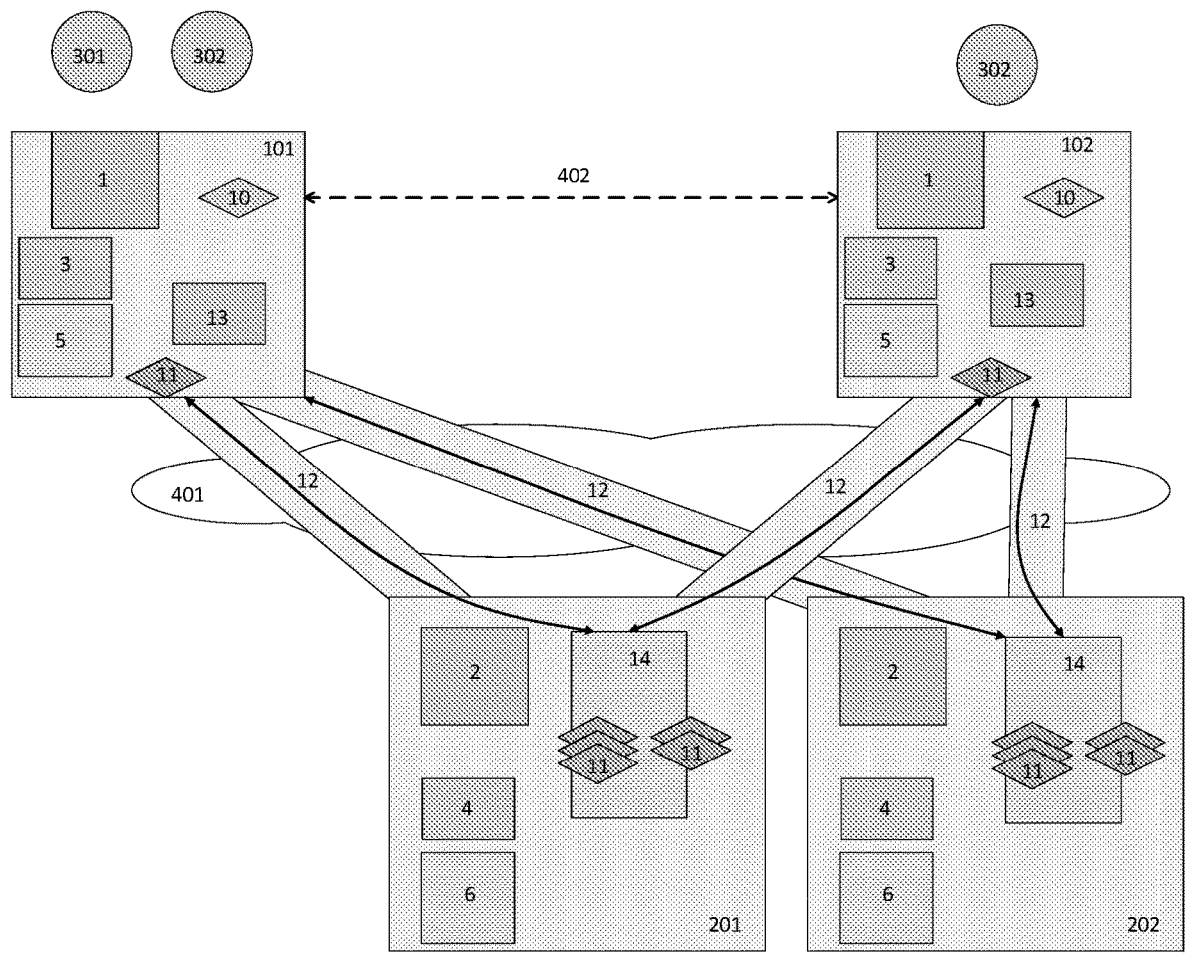
FIG. 3 is a schematic depiction of the system according to example 3.
Figure 4:
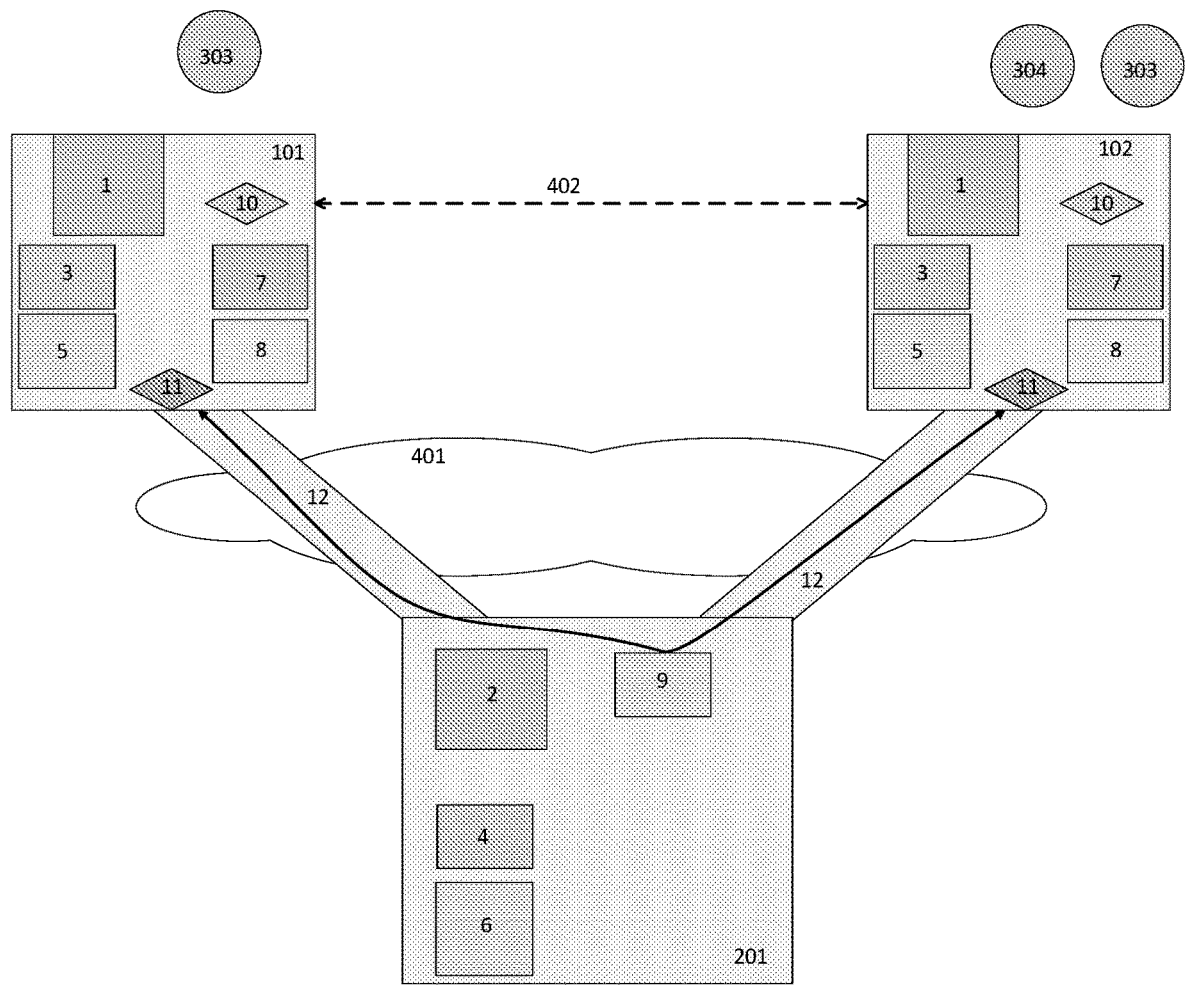
FIG. 4 is a schematic depiction of the system according to example 4.
Figure 5:
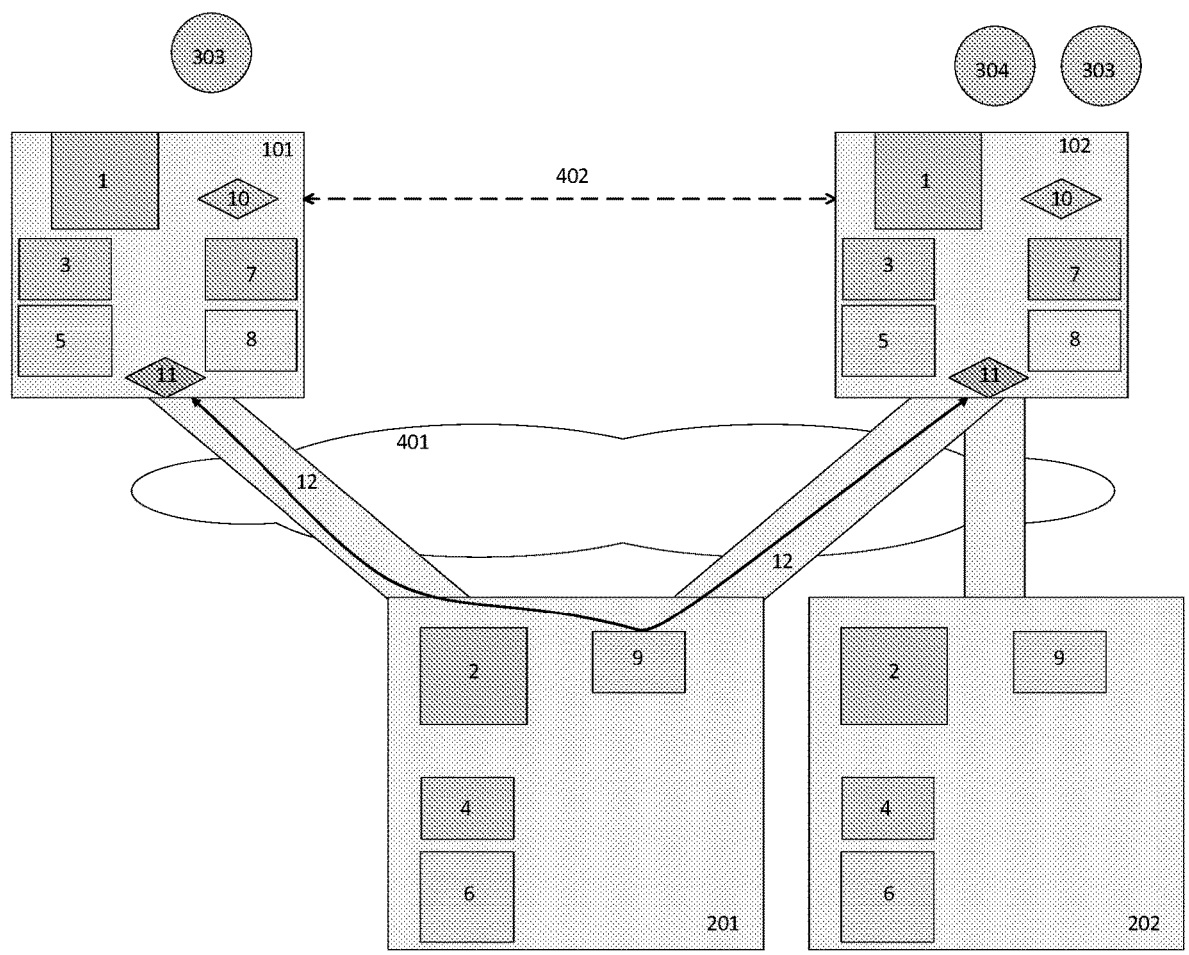
FIG. 5 is a schematic depiction of the system according to example 5.

Introduction:

The user first has the first (only) Authentication device on which he creates the Personal local authentication factor for two different service providers, SP1 and SP2.

The user then maps to his user account a second, backup Authentication device. The backup Authentication device is not equipped with the technical means necessary for the use of the Personal local authentication factor which the user has created on the First authentication device.

The First authentication device is subsequently stolen from the user. The user obtains a Third authentication device, which is equipped with the technical means necessary for the use of the Personal local authentication factor which the user has created on the First authentication device. The user maps to his user account this Third authentication device, using the second, backup Authentication device as the source device, and starts using the device and the services of the service providers SP1 and SP2.

Simultaneously, an unauthorised person who obtained the First authentication device and who does not have the Personal local authentication factor of the User available, is trying various wrong Personal local authentication factors.

This situation is automatically evaluated on the Servers of the Authentication Service Provider SP1 and SP2 and after the defined limit of attempts is exceeded, the Servers block the first (stolen) Authentication device and enable access to the service provider's services after authentication using the Third authentication device.

This means that even after the theft of the Authentication device, the (authorised) User can access the service provider's services, which require multi-factor authentication using the Personal local authentication factor and the unauthorised person who obtained the stolen Authentication device is prevented from abusing it.

The following description of an example shows the method of reaching the final situation described in the scenario.

The User has the First authentication device 101, which is, aside from other things, equipped with the Personal local authentication factor administration module 1. Each service provider SP1 and SP2 is equipped with its own Authentication server 201 and 202, which is equipped with the Personal local authentication factor administration support module 2.

The User first creates his Personal local authentication factor 301. This is accomplished in communication with the application which implements the appropriate service of service provider SP1.

In creation of Personal local authentication factor 301. The Personal local authentication factor administration module 1 may allow to choose the technology of Personal local authentication factor 301, if the technical means of the First authentication device 101 support multiple different technologies suitable for the use of Personal local authentication factor 301. If the First authentication device 101 is e.g. a smart phone application and the smart phone has the necessary technical means, it can for example offer the User the choice of entering the Personal local authentication factor 301 using the phone touch screen, the NFC, Bluetooth or using a fingerprint scanner.

After the User chooses the technology of Personal local authentication factor 301. The Personal local authentication factor administration module 1 prompts the User to enter the reference value of Personal local authentication factor 301. The Personal local authentication factor administration module 1 in co-operation with the Personal local authentication factor administration support module 2 of Authentication server 201 of service provider SP1 process the reference value in order to be able to check in the future that the same or a different Personal local authentication factor 301 value was entered.

The User than creates Personal local authentication factor 301 during communication with the application which implements the appropriate service of service provider SP2.

At this time, Personal local authentication factor 301 has already been created for service provider SP1. Personal local authentication factor administration module 1 of the First authentication device 101 prompts the User to enter Personal local authentication factor 301 without the choice of technology.

The Personal local authentication factor administration module 1 checks the correspondence of the entered value of Personal local authentication factor 301 with the reference value. To accomplish this, the Personal Local Authentication factor background verification module 3 is used in the background of the First authentication device 101, which co-operates with the Personal local authentication factor background verification support module 4 in the background of Authentication server 201 of service provider SP1.

In order to verify the correspondence of the entered value of Personal local authentication factor 301 with the reference value, Personal local authentication factor administration module 1 in co-operation with Personal local authentication factor administration support module 2 of Authentication server 202 of the service provider SP2 process the entered value in order to be able to check in the future that the same or a different Personal local authentication factor 301 value was entered.

This ensures that Personal local authentication factor administration module 1 in co-operation with both the Personal local authentication factor administration modules 2 of both Authentication servers 201 and 202 of both the service providers SP1 and SP2 check the correspondence of the entered value of Personal local authentication factor 301 with the same reference value.

From this point onwards, the User may use Personal local authentication factor 301 to authenticate for the services of service providers SP1 and SP2, while there is only one value of Personal local authentication factor 301 that is evaluated as correct (corresponding to the reference value). To verify the accuracy of the entered value, the Personal local authentication factor frontend verification module 5 of the Authentication device 101 and the Personal local authentication factor frontend verification support module 6 of the Authentication server 201 and 202 of the service providers SP1 and SP2 may be used.

The method of verification of the entered value of Personal local authentication factor 301 is known from the state of the art.

The User maps to his user account the Second authentication device 102 to serve as a backup and for manual recovery from an extraordinary situation (e.g. theft or malfunction of the First authentication device 101), i.e. he creates a replica.

The Primary module 7 of the replica of the First authentication device 101 in co-operation with the Secondary module 8 of the replica of the Second authentication device 102 and in co-operation with Support Module 9 of the replica of Authentication server 201 or 202 of service provider SP1 or SP2 creates a Secured communication channel 12 between the First authentication device 101 and the Second authentication device 102 via Authentication server 201 or 202 ensuring secure communication via Unsecured network 401.

The Personal local authentication factor administration module 1 of the First authentication device 101 generates the Authentication device secret 10. Primary module 7 of the replica of the First authentication device 101 transmits the Authentication device secret 10 directly to the Secondary module 8 of the replica of the Second authentication device 102 and the Secondary module 8 of the replica of the Second authentication device 102 transmits the Authentication device secret 10 to the Personal local authentication factor administration module 1 of the Second authentication device 102. This ensures both Personal local authentication factor administration modules 1 have available the same Authentication device secret 10, which has not been transmitted via the Authentication server 201 or 202.

The method of direct transmission of the Authentication device secret 10 may use any suitable communication technologies 402 between the technical means of Authentication devices 101 and 102, such as taking photo of QR code, infrared communication, NFC communication, direct connection, etc.

The method of direct transmission of the Authentication device secret 10 may consist in that the First authentication device 101 generates a one-time secret, which is used to encrypt the Authentication device secret 10. The one-time secret is transmitted directly from the First authentication device 101 to the Second authentication device 102 using some of the suitable communication technologies 402 between the technical means of Authentication devices 101 and 102, such as taking photo of QR code, infrared communication, NFC communication, direct connection, etc.

Authentication device secret 10 is included in Synchronization data 11.

The Second authentication device 102, following the receipt of Synchronization data 11 and prior to their further processing, decrypts the Authentication device secret 10 using the directly transmitted One-time secret.

The Personal local authentication factor administration module 1 of the First authentication device 101 prepares Synchronization data 11 containing all necessary information for verification of the Personal local authentication factor 301, where the sensitive items are encrypted using the Authentication device secret 10.

Primary module 7 of the replica of the First authentication device 101 in co-operation with the Personal local authentication factor administration module 1 of the First authentication device 101 requests input of Personal local authentication factor 301.

Primary module 7 of the replica of the First authentication device 101 in co-operation with the Personal local authentication factor frontend verification module 5 of the First authentication device 101 and the Personal local authentication factor frontend verification support module 6 as a frontend task of Authentication server 201 or 202 of service provider SP1 or SP2 verifies the accuracy of Personal local authentication factor 301.

If Personal local authentication factor 301 is entered correctly, Primary module 7 of the replica of the First authentication device 101, using the Secured communication channel 12, transmits the prepared Synchronization data 11 to Secondary module 8 of the replica of the Second authentication device 102.

Secondary module 8 of the replica of the Second authentication device 202 processes received Synchronization data 11 in co-operation with the Personal local authentication factor administration module 1 of the Second authentication device 202. The Personal local authentication factor administration module 1 of the Second authentication device 202 decrypts the encrypted items of Synchronization data 11 using the Authentication device secret 10 and stores the data.

From this point in time, the Personal local authentication factor administration module 1 of the Second Authentication device 202 has available all the data necessary to ensure the function of Personal local authentication factor 301.

Since in this example, the technical means of the Second authentication device 102 do not allow to enter Personal local authentication factor 301, the Personal local authentication factor administration module 1 of the Second authentication device 102 does not allow the user to use Personal local authentication factor 301.

After it had been stolen, the First authentication device 101 was not available to the User, who obtained a third device and on this device he creates a Third authentication device 103, mapped to his user account, i.e. he is creating a replica.

In contrast to the previous description of creating a replica of the First authentication device 101 into the Second authentication device 102, the situation is different in that the Authentication device secret 10 has already been created and the User cannot enter Personal local authentication factor 301 on the Second authentication device 102. Apart from that, the situation is analogous to the process as described above. For this reason, only the differences in the method of creating a replica are described below.

The Personal local authentication factor administration module 1 of the Second authentication device 102 does not generate a different Authentication device secret 10, but uses Authentication device secret 10 it has received from the First authentication device 101.

Primary module 7 of the replica of the Second authentication device 102 in co-operation with the Personal local authentication factor administration module 1 of the Second authentication device 102 discovers that the technical means of the Second authentication device 102 do not allow to enter Personal local authentication factor 301. Therefore, it does not request input of Personal local authentication factor 301 and it does not verify its accuracy as described in the previous part of this example.

Primary module 7 of the replica of the Second authentication device 102 flags Synchronization data 11 with a flag denoting that Personal local authentication factor 301 was not verified.

Secondary module 8 of the replica of the Third authentication device 103 processes received Synchronization data 11 in co-operation with the Personal local authentication factor administration module 1 of the Third authentication device 103. The Personal local authentication factor administration module 1 of the Third authentication device 103 decrypts the encrypted items of Synchronization data 11 using the Authentication device secret 10.

Based on the non-verification flag of Personal local authentication factor 301, the Secondary module 8 of the replica of the Third authentication device 103 requests the input of Personal local authentication factor 301 in co-operation with the Personal local authentication factor administration module 1 of the Third authentication device 103.

Secondary module 8 of the replica of the Third authentication device 103 in co-operation with the Personal local authentication factor background verification module 3 of the Third authentication device 103, which co-operates with the Personal local authentication factor background verification support module 4 of Authentication server 201 or 202 of service provider SP1 or SP2 verifies the accuracy of Personal local authentication factor 301.

If Personal local authentication factor 301 has been inputted correctly, the processed Synchronization data 11 are stored. In case of incorrect input, the data are deleted and the situation is signalled to the Primary module 7 of the replica of the Second authentication device 102 and Support module 9 of the replica of Authentication server 201 or 202 of service provider SP1 or SP2.

In the event of correct input, from this point onward the Personal local authentication factor administration module 1 of the Third authentication device 103 has all the necessary data needed to ensure the function of the Personal local authentication factor 301.

Since, in this example, the technical means of the Third authentication device 103 do allow to enter Personal local authentication factor 301, the Personal local authentication factor administration module 1 of the Third authentication device 103 does allow the User to use Personal local authentication factor 301 in the full extent.

At this point, the unauthorised user, who in this example has available the First authentication device 101, attempts to access the applications of service provider SP1 or SP2. The First Authentication device 101 using the Personal local authentication factor administration module 1 of the First authentication device 101 requests input of Personal local authentication factor 301. The unauthorised user tries to input various values, since he does not know the Personal Local Authentication Factor 301 or does not have it available.

In each attempt, the Personal local authentication factor administration module 1 of the First authentication device 101 verifies the accuracy of the input value. The Personal local authentication factor frontend verification module 5 of the First authentication device 101 and the Personal local authentication factor frontend verification support module 6 of Authentication server 201 or 202 of service providers SP1 or SP2 may be used to do that.

In the same period, the User uses the Third authentication device 103 to access the applications of service provider SP1 or SP2. The Personal local authentication factor administration module 1 of the Third authentication device 103 also verifies the accuracy of the input value of Personal local authentication factor 301. Module 5 of the personal local authentication factor verification as a frontend task of the Third authentication device 103 and the Personal local authentication factor frontend verification support module 6 of Authentication server 201 or 202 of service providers SP1 or SP2 may be used to do that.

The Personal local authentication factor frontend verification support module 6 of Authentication server 201 or 202 processes and verifies Personal local authentication factor 301 from two Authentication devices 101 and 103 from the same user (created through replication, i.e. mapped to the same user account), where the results of the verification differ because the User knows or has available the correct Personal local authentication factor 301 and the unauthorised user does not.

In each verification of the Personal local authentication factor 301. The Personal local authentication factor frontend verification support module 6 of the Authentication server 201 or 202 evaluates the parameters of different behaviour and in case the limits are exceeded, it carries out the appropriate action. For example, it may block the use of the First authentication device 101.

The criteria and the algorithm of different behaviour and the specific form of the triggered action may differ. An example of the criterion and algorithm: in the period from the first incorrectly input Personal local authentication factor 301 on one Authentication device 101 or 103, the Personal local authentication factor 301 is inputted at least A times correctly on a different Authentication device 103 or 101 of the same user (replica) and B times incorrectly on the same Authentication device 101 or 103, this is evaluated as inconsistent behaviour.

From this point onward, the unauthorised user cannot abuse the First authentication device 101 and, at the same time, the User may continue using the Third authentication device 103 without limitations.

Example 2

Introduction:

The User first obtains the First authentication device and also a second, backup Authentication device by means of mapping both devices to the same user account. The backup Authentication device is not equipped with the technical means necessary for the use of the Personal local authentication factor which the User wants to use on the First authentication device.

Subsequently, the User creates a Personal local authentication factor on the First authentication device for two different service providers SP1 and SP2, and uses the First authentication device including the Personal local authentication factor for these two different service providers SP1 and SP2.

The First authentication device is subsequently stolen from the user. Simultaneously, the unauthorised person who obtained the First authentication device and who does not have the Personal local authentication factor of the User available deletes the User's Personal local authentication factor.

The User obtains a Third authentication device, which is equipped with the technical means necessary for the use of the Personal local authentication factor which the User has created on the First authentication device. The User maps to his user account this Third authentication device, using the second, backup Authentication device and starts using the device and the services of service providers SP1 and SP2.

After the unauthorised person has cancelled the Personal local authentication factor on the First authentication device, the User uses the Third authentication device which requests confirmation of the deletion of the Personal local authentication factor. The User declines the confirmation, and subsequently the Third authentication device verifies the Personal Local Authentication Factor, and, if the verification is successful, the First authentication device is automatically blocked.

This means that even after the theft of the Authentication device, the (authorised) User can access the service provider's services, which require authentication using the Personal local authentication factor and the unauthorised person who obtained the stolen Authentication device is prevented from abusing it.

The following example shows the method of reaching the final situation described in the scenario.

The User has the First authentication device 101, which is, aside from other things, equipped with Primary module 7 of the replica of the First authentication device 101. The User also has the Second authentication device 102, which is, aside from other things, equipped with Secondary module 8 of the replica. Each service provider SP1 and SP2 is equipped with its own Authentication server 201 and 202, which is equipped with Support module 9 of the replica of each of Authentication server.

The User has so far not created Personal local authentication factor 301 on any of the Authentication devices.

The User maps to his user account the Second authentication device 102 to serve as a backup and for manual recovery from an extraordinary situation (e.g. theft or malfunction of the First authentication device 101).

In co-operation with the Secondary module 8 of the replica of the Second authentication device 102 and in co-operation with the Support module 9 of the replica of Authentication server 201 or 202 of service provider SP1 or SP2, Primary module 7 of the replica of the First authentication device 101 creates a secured communication channel 12 between the First authentication device 101 and the Second authentication device 102 via Authentication server 201 or 202 ensuring secure communication via Unsecured network 401.

The Personal local authentication factor administration module 1 of the First authentication device 101 generates the Authentication device secret 10. Primary module 7 of the replica of the First authentication device 101 transmits the Authentication device secret 10 directly via direct communication 402 to the Secondary module 8 of the replica of the Second authentication device 102 and the Secondary module 8 of the replica of the Second authentication device 102 transmits the Authentication device secret 10 to the Personal local authentication factor administration module 1 of the Second authentication device 102. This ensures both the Personal local factor administration modules 1 have available the same Authentication device secret 10, without the intermediary of the Authentication server 201 or 202.

From this point onward, the User has available two Authentication devices 101 and 102, which may be used alternatively and which serve as backups of each other. The User does not have the possibility of using a Personal local authentication factor.

The User subsequently creates his Personal local authentication factor 301. This is accomplished in communication with the application which implements the appropriate service of service provider SP1.

In creation of Personal local authentication factor 301, the Personal local authentication factor administration module 1 may allow to choose the technology of Personal local authentication factor 301 if the technical means of the First authentication device 101 support multiple different technologies suitable for the use of Personal local authentication factor 301. If Authentication device 101 is e.g. a smart phone application and the smart phone has the necessary technical means, it can for example offer the user the choice of entering the Personal local authentication factor 301 using the phone touch screen, the NFC, Bluetooth or using a fingerprint scanner.

After the User chooses the technology of Personal local authentication factor 301, the Personal local authentication factor administration module 1 prompts the User to enter the reference value of Personal local authentication factor 301. The Personal local authentication factor administration module 1 in co-operation with the Personal local authentication factor administration support module 2 of Authentication server 201 of service provider SP1 process the reference value in order to be able to check in the future that the same or a different Personal local authentication factor 301 value was entered.

The Personal local authentication factor administration module 1 of the First authentication device 101 prepares Synchronisation data 11 containing all necessary information for verification of Personal local authentication factor 301, in which the sensitive items are encrypted using the Authentication device secret 10.

The Personal local authentication factor administration module 1 transmits Synchronization data 11 on to the Transmission synchronization module 13.

The Transmission synchronization module 13 in sequence creates Secured communication channels 12 between the First authentication device 101 and all Authentication servers on which Personal local authentication factor 301 has been created, which is Authentication server 201 at this moment in this example.

The Transmission synchronization module 13 transmits Synchronization data 11 using the Secured communication channel 12 to the Synchronization queue module 14 of the appropriate Authentication server 201.

The Synchronization queue module 14 processes the received Synchronization data 11 in that it timestamps them and prepares them for being transmitted to all replicas (i.e. all the authentication devices mapped to the User account), i.e. in this example to the Second authentication device 102.

The processed Synchronization data 11 wait for the first moment when the User uses the Second authentication device 102 to authenticate with Authentication server 201.

The User than creates Personal local authentication factor 301 in communication of the First authentication device 101 with the application which implements the appropriate service of service provider SP2.

At this time, Personal local authentication factor 301 has already been created for service provider SP1. The Personal local authentication factor administration module 1 of the First authentication device 101 prompts the User to enter Personal local authentication factor 301 without the choice of technology.

The Personal local authentication factor administration module 1 checks the correspondence of the entered value of Personal local authentication factor 301 with the reference value. To accomplish this, the Personal local authentication factor background verification module 3 uses verification of the Personal Local Authentication Factor 301 in the background of the First authentication device 101, which co-operates with the Personal local authentication factor background verification support module 4 of Authentication server 201 of service provider SP1.

In order to verify the correspondence of the entered value of Personal local authentication factor 301 with the reference value, the Personal local authentication factor administration module 1 in co-operation with the Personal local authentication factor administration support module 2 of Authentication server 202 of service provider SP2 process the entered value in order to be able to check in the future that the same or a different Personal local authentication factor 301 value was entered.

This ensures that the Personal local authentication factor administration module 1 in co-operation with both the Personal local authentication factor support modules 2 of both Authentication servers 201 and 202 of both service providers SP1 and SP2 check the correspondence of the entered value of Personal local authentication factor 301 with the same reference value.

Aside from the Personal local authentication factor administration module 1 of the First authentication device 101 prepares Synchronization data 11 containing all necessary information for verification of Personal local authentication factor 301, in which the sensitive items are immediately encrypted using the Authentication device secret 10. In this case, Synchronisation data 11 additionally contain information necessary to verify Personal local authentication factor 301 also by Authentication server 202 of service provider SP2.

The Personal local authentication factor administration module 1 passes Synchronization data 11 on to the Transmission synchronization module 13.

The Transmission synchronization module 13 in sequence creates Secured communication channels 12 between the First authentication device 101 and all Authentication servers on which Personal local authentication factor 301 has been created; i.e. at this moment in this example, this concerns Authentication server 201 and also Authentication server 202.

The Transmission synchronization module 13 transmits Synchronization data 11 using the Secured communication channel 12 to the Synchronization queue module 14 of the appropriate Authentication server, i.e. Authentication server 201 and Authentication server 202 in this case.

The Synchronization queue module 14 processes the received Synchronization data 11 in that it timestamps them and prepares them for being transmitted to all replicas, which is the Second authentication device 102 at this moment in this example.

The processed Synchronization data 11 wait for the first moment when the User uses the Second authentication device 102 to authenticate with Authentication server 201 or Authentication server 202.

From this point onwards, the User may use Personal local authentication factor 301 to authenticate for the services of service providers SP1 and SP2, while there is only one value of Personal local authentication factor 301 that is evaluated as correct (corresponding to the reference value). To verify the accuracy of the entered value, it is possible to use the Personal local authentication factor frontend verification module 5 of Authentication device 101 or 102 and the Personal local authentication factor frontend verification support module 6 of Authentication server 201 or 202 of service providers SP1 and SP2.

If the User uses the Second authentication device 102 to authenticate with Authentication server 201 or with Authentication server 202 (which may consists also in replication during creation of the Third authentication device 103), Synchronisation data 11 are processed prior to any other activities with Personal local authentication factor 301, using the following method.

After the Second authentication device 102 and the appropriate Authentication server 201 or 202 have authenticated each other and created Secured communication channel 12, all Synchronization data 11 from the Synchronization queue module 14 are transferred to the Second authentication device 102 and processed by the Personal local authentication factor administration module 1.

From this point in time, the Personal local authentication factor administration module 1 of the Second authentication device 102 has available all the data necessary to ensure the function of Personal local authentication factor 301.

Since, in this example, the technical means of the Second authentication device 102 do not allow to enter Personal local authentication factor 301, the Personal local authentication factor administration module 1 of the Second authentication device 102 does not allow the user to use Personal local authentication factor 301.

In the next part of the example, the Authentication device 101 is no longer available to the User (e.g. due to malfunction, loss, or theft). Therefore, the User has obtained a third device and, on this device, he creates a Third authentication device 103, i.e. he maps it to his user account at service providers SP1 and SP2.

This is done in the same manner as described in Example 1.

Since, in this example, the technical means of the Third authentication device 103 do allow to enter Personal local authentication factor 301, the Personal local authentication factor administration module 1 of the Third authentication device 103 does allow the User to use Personal local authentication factor 301 in the full extent.

The unauthorised user who in this example has available the First authentication device 101, has decided to delete Personal local authentication factor 301, which he does not know or which is not available to him.

Using the control elements of the First authentication device 101 (e.g. smart phone touchscreen graphic interface), the unauthorised user enters the request to delete Personal local authentication factor 301.

The First authentication device 101 processes the request and transmits it to the Personal local authentication factor administration module 1. The Personal local authentication factor administration module 1 deletes and modifies its internal data and prepares Synchronization data 11, which it flags for the request for deletion of Personal local authentication factor 301 at the ser's behest.

The Personal local authentication factor administration module 1 transmits Synchronization data 11 on to the Transmission synchronization module 13.

The Transmission synchronization module 13 in sequence creates Secured communication channels 12 between the First authentication device 101 and all Authentication servers on which Personal local authentication factor 301 has been created; at this moment in this example, this concerns Authentication server 201 and Authentication server 202.

The Transmission synchronization module 13 transmits Synchronization data 11 using the Secured communication channel 12 to the Synchronization queue module 14 of the appropriate Authentication server, i.e. Authentication server 201 and Authentication server 202 in this case.

The Synchronization queue module 14 processes the received Synchronization data 11 in that it timestamps them, flags the internal data used to verify Personal local authentication factor 301 with the flag of request for deletion entered by the user of the First authentication device 101, and prepares them for being transmitted to all replicas (i.e. the authentication devices mapped to the User account), i.e. to the Second authentication device 102 and the Third authentication device 103 at this moment in this example.

The processed Synchronization data 11 wait for the first moment when the User uses the Second authentication device 102 or the Third authentication device 103 to authenticate with Authentication server 103 or Authentication server 202.

Once the User uses for example the Third authentication device 103 to authenticate with Authentication server 201, Synchronisation data 11 are processed prior to any other activities with Personal local authentication factor 301, using the following method.

After the Third authentication device 103 and Authentication server 201 have authenticated each other and created Secured communication channel 12, all Synchronization data 11 from the Synchronization queue module 14 are transferred to the Third authentication device 103 and processed by the Personal local authentication factor administration module 1.

Synchronisation data 11 contain also information about the request for deletion of Personal local authentication factor 301 at the behest of the user of the First authentication device 101.

While processing Synchronization data 11 on the basis of the information on the request for deletion of Personal local authentication factor 301 at the behest of the user of the First authentication device 101 the Personal local authentication factor administration module 1 of the Third authentication device 103 requests confirmation of deletion of Personal local authentication factor 301 from the User.

In case the User declines (since the User has not entered the request on the First authentication device 101 and the request was in fact entered by an unauthorised user). The Personal local authentication factor administration module 1 of the Third authentication device 103 requests input of Personal local authentication factor 301.

Once the User enters Personal local authentication factor 301, The Personal local authentication factor administration module 1 of the Third authentication device 103 verifies the accuracy of the User-entered Personal local authentication factor 301 (i.e. verifies the correspondence with the previously set reference value), using the Personal local authentication factor frontend verification module 5 of Authentication device 103 and the Personal local authentication factor frontend verification support module 6 of Authentication server 201 of service provider SP1.

If correct Personal local authentication factor 301 is entered, the Personal local authentication factor administration module 1 processes Synchronization data 11 in that it does not delete Personal local authentication factor 301 and creates different Synchronization data 11, which are flagged with the flag of User-declined request for deletion of Personal local authentication factor 301.

The Personal local authentication factor administration module 1 transmits Synchronization data 11 on to the Transmission synchronization module 13.

The Transmission synchronization module 13 in sequence creates Secured communication channels 12 between the Third authentication device 103 and all Authentication servers on which Personal local authentication factor 301 has been created; at this moment in this example, this concerns Authentication server 201 and Authentication server 202.

The Transmission synchronization module 13 transmits Synchronization data 11 using the Secured communication channel 12 to the Synchronization queue module 14 of the appropriate Authentication server, i.e. Authentication server 201 and Authentication server 202 in this case.

The Synchronization queue module 14 processes the received Synchronization data 11 in that it timestamps them, flags the internal data used to verify Personal local authentication factor 301 with the flag of declined request for deletion entered by the user of the First authentication device 101, prepares them for being transmitted to all replicas, i.e. for example to the Second authentication device 102, and also blocks the use of the First authentication device 101 with the Authentication server on which the Synchronization queue module 14 operates—in this example, this is Authentication server 201 and then Authentication server 202.

From this point onward, the unauthorised user cannot abuse the First authentication device 101 and, at the same time, the User may continue using the Third authentication device 103 without limitations.

Example 3

Introduction:

The User first have the first (only) Authentication device on which he creates the Personal local authentication factor for two different service providers, SP1 and SP2.

The User then maps to his user account a Second authentication device, i.e. he creates a replica. The Second authentication device is not equipped with the technical means necessary for the use of the Personal local authentication factor which the User has created on the First authentication device. The User wishes to use the Second authentication device as a backup, but also for authentication to services which require verification of the Personal local authentication factor.

The User changes the Personal local authentication factor on the First authentication device to a technology supported by both Authentication devices.

Subsequently, the First authentication device and also the Second authentication device may be used with the same Personal local authentication factor.

The following example shows the method of reaching the final situation described in the scenario.

The method of creation of Personal local authentication factor 301 and mapping the Second authentication device 102 to the user account is identical with the method described in example 1.

At the moment the User wants to change the Personal local authentication factor 301, he enters the request to change Personal local authentication factor 301, using the control elements of the First authentication device 101 (e.g. smart phone touchscreen graphic interface).

The First authentication device 101 processes the request and transmits it to the Personal local authentication factor administration module 1. The Personal local authentication factor administration module 1 allows the User to choose the technology of the Changed personal local authentication factor 302 in accordance with the technical means of the Authentication device 101. The User may choose a technology of the Changed personal local authentication factor 302 that is different from the technology of the original Personal local authentication factor 301.

After the User chooses the technology for the Changed personal local authentication factor 302, the Personal local authentication factor administration module 1 prompts the User to enter the value of the Changed personal local authentication factor 302 and also to enter the value of the original Personal local authentication factor 301.

The Personal local authentication factor administration module 1 checks the correspondence of the entered value of the original Personal local authentication factor 301 with the reference value. To accomplish this, the Personal local authentication factor background verification module 3 uses verification of the Personal local authentication factor 301 in the background of the First authentication device 101, which co-operates with Personal local authentication factor background verification support module 4 in the background of Authentication server 201 or Authentication server 202 of service provider SP1 or SP2.

In order to verify the correspondence of the entered value of Personal local authentication factor 301 with the reference value, the Personal local authentication factor administration module 1 processes both entered values in order to be able to check in the future whether the same or a different value of the Changed personal local authentication factor 302 value was entered.

The Personal local authentication factor administration module 1 modifies its internal data and prepares Synchronization data 11, in which it indicates the values necessary for evaluation of the Changed personal local authentication factor 302. Sensitive values are encrypted using the Authentication device secret 10.

The Personal local authentication factor administration module 1 transmits Synchronization data 11 on to the Transmission synchronization module 13.

The Transmission synchronization module 13 in sequence creates Secured communication channels 12 between the First authentication device 101 and all Authentication servers on which Personal local authentication factor 301 has been created; at this moment in this example, this concerns Authentication server 201 and Authentication server 202.

The Transmission synchronization module 13 transmits Synchronization data 11 using the Secured communication channel 12 to the Synchronization queue module 14 of the appropriate Authentication server, i.e. Authentication server 201 and Authentication server 202 in this case.

The Synchronization queue module 14 processes the received Synchronization data 11 in that it timestamps them, or modifies internal data used to verify the Personal local authentication factor 301 so that they can verify the Changed personal local authentication factor 302, and prepares them for being transmitted to all replicas, i.e. the Second authentication device 102 at this moment in this example.

The processed Synchronization data 11 wait for the first moment when the User uses the Second authentication device 102 to authenticate with Authentication server 201 or Authentication server 202.

Once the User uses for example the Second authentication device 102 to authenticate with Authentication server 201, Synchronisation data 11 are processed prior to any other activities with the original Personal local authentication factor 301 or the Changed personal local authentication factor 302, using the following method.

After the Second authentication device 102 and Authentication server 201 have authenticated each other and created Secured communication channel 12, all Synchronization data 11 from The Synchronization queue module 14 are transferred to the Second authentication device 102 and processed by the Personal local authentication factor administration module 1.

Synchronisation data 11 contains also all information on the request for change of the original Personal local authentication factor 301 to the Changed personal local authentication factor 302 carried out at the behest of the User of the First authentication device 101. The information contains also information on the changed technology of Personal local authentication factor 302. Encrypted items are decrypted using the Authentication device secret 10, which is available to the Second authentication device 102 from the moment of creation of the replica.

The Personal local authentication factor administration module 1 of the Second authentication device 102, while processing Synchronization data 11 on the basis of the information on the request for change of Personal local authentication factor 301 updates the internal information including the technology of the Changed personal local authentication factor 302 and the data needed to evaluate the Changed personal local authentication factor 302.

From this moment onward, the User may input the Changed personal local authentication factor 302 also on the Second authentication device 102 and the Changed personal local authentication factor 302 is evaluated as being the same as if entered on the First authentication device 101.

Example 4

Introduction:

The User has two Authentication devices, and uses both for the same service provider. He created a different Personal local authentication factor on each device. The two Authentication devices are not mapped to the same user account and can therefore not substitute for each other or serve as backups of each other.

The user then maps both Authentication devices to the same user account. Subsequently, the First authentication device and also the Second authentication device may be used with the same Personal local authentication factor.

The following example shows the method of reaching the final situation described in the scenario.

The User has the First authentication device 101, which is, aside from other things, equipped with the Personal local authentication factor administration module 1. Service provider SP1 is equipped with its own Authentication server 201, which is equipped with the Personal local authentication factor administration support module 2.

The User first creates his First personal local authentication factor 303 using the First authentication device 101. This is accomplished in communication with the application which implements the appropriate service of service provider SP1.

In creation of the First personal local authentication factor 303, the Personal local authentication factor administration module 1 may allow to choose the technology of the Personal local authentication factor, if the technical means of the First authentication device 101 support multiple different technologies suitable for the use of the Personal local authentication factor.

After the User chooses the technology of Personal local authentication factor 303, the Personal local authentication factor administration module 1 prompts the User to enter the reference value of the First personal local authentication factor 303. The Personal local authentication factor administration module 1 in co-operation with the Personal local authentication factor administration support module 2 of Authentication server 201 of service provider SP1 process the reference value in order to be able to check in the future that the same or a different value of the First personal local authentication factor 303 value was entered.

From this moment onward, the User may use the First personal local authentication factor 303 to authenticate with the services of service provider SP1. To verify the accuracy of the entered value, it is possible to use the Personal local authentication factor frontend verification module 5 of Authentication device 101 and the Personal local authentication factor frontend verification support module 6 of Authentication server 201.

The User has the First authentication device 101 and also the Second authentication device 102, which is, aside from other things, equipped with the Personal local authentication factor administration module 1.

The User creates his Second personal local authentication factor 304 using the Second authentication device 102. This is accomplished in communication with the application which implements the appropriate service of service provider SP1.

In creation of the Second personal local authentication factor 304, the Personal local authentication factor administration module 1 of the Second authentication device 102 may also allow to choose the technology of the Personal local authentication factor if the technical means of the Second authentication device 102 support multiple different technologies suitable for the use of the Personal local authentication factor.

After the User chooses the technology of Personal local authentication factor 304, the Personal local authentication factor administration module 1 prompts the user to enter the reference value of the Second personal local authentication factor 304. The Personal local authentication factor administration module 1 in co-operation with the Personal local authentication factor administration support module 2 of Authentication server 201 of service provider SP1 process the reference value in order to be able to check in the future whether the same or a different value of the Second personal local authentication factor 304 value was entered.

From this moment onward, the User may use the Second personal local authentication factor 304 to authenticate with the services of the services provider SP1 using the Second authentication device 102 and he can also use the First personal local authentication factor 303 to authenticate to the services of service provider SP1 using the First authentication device 101. The First personal local authentication factor 303 is in no way linked with the Second personal local authentication factor 304, it can have a different correct value and use a different technology. The First authentication device 101 and the Second authentication device 102 cannot serve as backups of each other. A change or deletion of the First personal local authentication factor 303 in no way affects the Second personal local authentication factor 304 and vice versa. Incorrect or different use of both Personal local authentication factor 303, 304 can be used to identify abuse by unauthorised user.

In this example, the user decided at this moment to change the situation and map the First authentication device 101 and the Second authentication device 102 to the same user account.

In co-operation with the Secondary module 8 of the replica of the Second authentication device 102 and in co-operation with Support module 9 of the replica of Authentication server 201 or of service provider SP1, Primary module 7 of the replica of the First authentication device 101 creates a secured communication channel 12 between the First authentication device 101 and the Second authentication device 102 via Authentication server 201 ensuring secure communication via Unsecured network 401.

The Personal local authentication factor administration module 1 of the First authentication device 101 generates the Authentication device secret 10. Primary module 7 of the replica of the First authentication device 101 transmits the Authentication device secret 10 directly to the Secondary module 8 of the replica of the Second authentication device 102 and the Secondary module 8 of the replica of the Second authentication device 102 transmits the Authentication device secret 10 to the Personal local authentication factor administration module 1 of the Second authentication device 102. This ensures both the Personal local authentication factor administration modules 1 have available the same Authentication device secret 10, which has not been transmitted via the Authentication server 201.

Direct transfer of the Authentication device secret 10 may be accomplished e.g. using some of the suitable communication technologies 402 between the technical means of Authentication devices 101 and 102, such as taking photo of a QR code, infrared communication, NFC communication, direct connection, etc.

The Personal local authentication factor administration module 1 of the First authentication device 101 prepares Synchronization data 11 containing all necessary information for verification of Personal local authentication factor 303, in which the sensitive items are encrypted using the Authentication device secret 10.

In co-operation with the Personal local authentication factor administration module 1 of the First authentication device 101 Primary module 7 of the replica of the First authentication device 101 requests input of the First personal local authentication factor 303.

In co-operation with the Personal local authentication factor frontend verification module 5 as of the First authentication device 101 and the Personal local authentication factor frontend verification support module 6 of Authentication server 201 of service provider SP1, Primary module 7 of the replica of the First authentication device 101 verifies the accuracy of the First personal local authentication factor 303.

If the First personal local authentication factor 303 is entered correctly, Primary module 7 of the replica of the First authentication device 101, using the secured communication channel 12, transmits the prepared Synchronization data 11 to Secondary module 8 of the replica of the Second authentication device 102.

Secondary module 8 of the replica of the Second authentication device 102 processes received Synchronization data 11 in co-operation with the Personal local authentication factor administration module 1 of the Second authentication device 102. The Personal local authentication factor administration module 1 of the Second authentication device 102 decrypts the encrypted items of Synchronization data 11 using the Authentication device secret 10 and stores the data. At this moment in this example, the Personal local authentication factor administration module 1 of the Second authentication device 102 has available the internal data necessary to authenticate the Second personal local authentication factor 304, from which it ascertains that the Second personal local authentication factor 304 is not used by any other authentication server but Authentication server 201 of service provider SP1, and, therefore, in processing of Synchronization data 11 by the Personal local authentication factor administration module 1 of the Second authentication device 102, it deletes the internal data of the Second personal local authentication factor 304 and replaces them with the data of the First personal local authentication factor 303, which are part of Synchronization data 11.

From this point in time, the Personal local authentication factor administration module 1 of the Second authentication device 102 has available all the data necessary information to ensure the function of the First personal local authentication factor 303.

Both Authentication devices 101 and 102 allow the evaluation of the single Personal local authentication factor 303, they can backup each other and incorrect or different use of Personal local authentication factor 303 can be used to identify abuse by an unauthorised user.

Example 5

Introduction:

The User has two Authentication devices and he uses each for a different service provider.

He has created a different Personal local authentication factor on each device.

The User then maps both Authentication devices to the same user account. Since the Personal local authentication factors are not the same and, at the same time, they are necessary, the User has to merge both Personal local authentication factors during replication.

After that, the First authentication device and also the Second authentication device may be used with the same Personal local authentication factor for all service providers. Both devices also serve as backups of each other.

The following description of an example shows the method of reaching the final situation described in the scenario.

The User has the First authentication device 101, which is, aside from other things, equipped with the Personal local authentication factor administration module 1. Service provider SP1 is equipped with its own Authentication server 201, which is equipped with the Personal local authentication factor administration support module 2.

The User first creates his First personal local authentication factor 303 using the First authentication device 101. This is accomplished in communication with the application which implements the appropriate service of the service provider SP1.

In creation of the First personal local authentication factor 303, the Personal local authentication factor administration module 1 may allow to choose the technology of the Personal local authentication factor if the technical means of the First authentication device 101 support multiple different technologies suitable for the use of the Personal local authentication factor 303.

After the User chooses the technology of Personal local authentication factor, the Personal local authentication factor administration module 1 prompts the User to enter the reference value of the First personal local authentication factor 303. The Personal local authentication factor administration module 1 in co-operation with the Personal local authentication factor administration support module 2 of Authentication server 201 of service provider SP1 process the reference value in order to be able to check in the future that the same or a different value of the First personal local authentication factor 303 value was entered.

From this moment onward, the User may use the First personal local authentication factor 303 to authenticate with the services of service provider SP1. To verify the accuracy of the entered value, it is possible to use the Personal local authentication factor frontend verification module 5 of Authentication device and the Personal local authentication factor frontend verification support module 6 of Authentication server 201 of service provider SP1.

The User has the First authentication device 101 and also the Second authentication device 102, which is, aside from other things, equipped with the Personal local authentication factor administration module 1.

The User creates his Second personal local authentication factor 304 using the Second authentication device 102 for the service of the second service provider SP2. This is accomplished in communication with the application which implements the appropriate service of the service provider SP2.

Also in creation of the Second personal local authentication factor 304. The Personal local authentication factor administration module 1 of the Second authentication device 102 may allow to choose the technology of the Personal local authentication factor if the technical means of the Second authentication device 102 support multiple different technologies suitable for the use of the Personal local authentication factor.

After the User chooses the technology of Personal local authentication factor, the Personal local authentication factor administration module 1 prompts the User to enter the reference value of the Second personal local authentication factor 304. In co-operation with the Personal local authentication factor administration support module 2 of Authentication server 202 of service provider SP2, the Personal local authentication factor administration module 1 processes the reference value in order to be able to check in the future whether the same or a different value of the Second personal local authentication factor 304 value was entered.

From this moment onward, the User may use the Second personal local authentication factor 304 to authenticate with the services of the services provider SP2 using the Second authentication device 102 and he can also use the First personal local authentication factor 303 to authenticate to the services of service provider SP1 using the First authentication device 101. The First personal local authentication factor 303 is in no way linked with the Second personal local authentication factor 304, it can have a different correct value and use a different technology. The First authentication device 101 and the Second authentication device 102 cannot serve as backups of each other. A change or deletion of the First personal local authentication factor 303 in no way affects the Second personal local authentication factor 304 and vice versa. Incorrect or inconsistent use of both Personal local authentication factor 303, 304 cannot be used to identify abuse by unauthorised user.

In this example, the user decided at this moment to change the situation and map the First authentication device 101 and the Second authentication device 102 to the same user account.

In co-operation with the Secondary module 8 of the replica of the Second authentication device 102 and in co-operation with Support module 9 of the replica of Authentication server 201 or of the service provider SP1, Primary module 7 of the replica of the First authentication device 101 creates a secured communication channel 12 between the First authentication device 101 and the Second authentication device 102 via Authentication server 201 ensuring secure communication via Unsecured network 401.

The Personal local authentication factor administration module 1 of the First authentication device 101 generates the Authentication device secret 10. Primary module 7 of the replica of the First authentication device 101 transmits the Authentication device secret 10 directly via suitable communication technology 402 to Secondary module 8 of the replica of the Second authentication device 102 and Secondary module 8 of the replica of the Second authentication device 102 transmits the Authentication device secret 10 to the Personal local authentication factor administration module 1 of the Second authentication device 102. This ensures both of the Personal local authentication factor administration modules 1 have available the same the Authentication device secret 10, which has not been transmitted via Authentication server 201.

The Personal local authentication factor administration module 1 of the First authentication device 101 prepares Synchronization data 11 containing all necessary information for verification of Personal local authentication factor 303, in which the sensitive items are encrypted using the Authentication device secret 10.

In co-operation with the Personal local authentication factor administration module 1 of the First authentication device 101 Primary module 7 of the replica of the First authentication device 101 requests input of the First personal local authentication factor 303.

In co-operation with the Personal local authentication factor frontend verification module 5 of the First authentication device 101 and the Personal local authentication factor frontend verification support module 6 of Authentication server 201 of the service provider SP1, Primary module 7 of the replica of the First authentication device 101 verifies the accuracy of the First personal local authentication factor 303.

If the First personal local authentication factor 303 is entered correctly, Primary module 7 of the replica of the First authentication device 101, using the secured communication channel 12, transmits the prepared Synchronization data 11 to Secondary module 8 of the replica of the Second authentication device 102.

Secondary module 8 of the replica of the Second authentication device 102 processes received Synchronization data 11 in co-operation with the Personal local authentication factor administration module 1 of the Second authentication device 102. The Personal local authentication factor administration module 1 of the Second authentication device 102 decrypts the encrypted items of Synchronization data 11 using the Authentication device secret 10 and stores the data. At this moment in this example, the Personal local authentication factor administration module 1 of the Second authentication device 102 has available the internal data necessary to authenticate the Second personal local authentication factor 304, from which it ascertains that the Second personal local authentication factor 304 is used by another Authentication server 202 but Authentication server 201 of the service provider SP1; therefore, in processing of Synchronization data 11 by the Personal local authentication factor administration module 1 of the Second authentication device 102, it prompts the User to enter the First personal local authentication factor 303 and also the Second personal local authentication factor 304.

Secondary module 8 of the replica of the Second authentication device 102 in co-operation with the Personal local authentication factor frontend verification module 5 of the Second authentication device 102 and the Personal local authentication factor frontend verification support module 6 of Authentication server 201 of service provider SP1 or verifies the accuracy of the First personal local authentication factor 303.

In co-operation with the personal local authentication factor frontend verification module 5 as a frontend task of the Second authentication device 102 and the Personal local authentication factor frontend verification support module 6 of Authentication server 202 of the service provider SP2, Secondary module 8 of the replica of the Second authentication device 102 verifies the accuracy of the Second personal local authentication factor 304.

After ascertaining the match of the values of the First personal local authentication factor 303 and the Second personal local authentication factor 304 with the relevant reference values, the Personal local authentication factor administration module 1 processes both entered values in that the reference value of the Second personal local authentication factor 304 and also the technology of the Second personal local authentication factor 304 is overwritten to the value and technology of the First personal local authentication factor 303, and so that this can be verified in the future.

From this point in time, the Personal local authentication factor administration module 1 of the Second authentication device 102 has available all the data necessary to ensure the function of the First personal local authentication factor 303, and they replace the data used previously to ensure the function of the Second personal local authentication factor 304.

Both Authentication devices 101 and 102 allow the evaluation of the single Personal local authentication factor 303, they can backup each other and incorrect or inconsistent use of Personal local authentication factor 303 can be used to identify abuse by an unauthorised user.

In addition to this, verification of Personal local authentication factor 303 while using the Second authentication device 102 with the Second authentication server 202 is also functional.

The invention claimed is:

1. A method for mapping at least two authentication devices to a user account using an authentication server, comprising the steps of:

connecting each authentication device to the authentication server using a secured communication channel; and mapping said authentication devices to the account of said user on the authentication server, prior to mapping or simultaneously with mapping of the authentication devices to the user account on the authentication server, transmitting an authentication device secret by a first authentication device to a second authentication device directly, without an intermediary of the authentication server, and the authentication device secret is stored on the second authentication device;

wherein, if the mapping is the first mapping of another authentication device, the first authentication device generates the authentication device secret transmitting, at each following mapping of another authentication device, the authentication device secret stored on the first authentication device directly to said another authentication device, during any transfer of data between the authentication devices mapped to the account of said user, transmitting the data from a first authentication device to the authentication server using a secured communication channel and transmitting said data from the authentication server to another authentication device mapped to the account of said user using a secured communication channel when the other authentication device creates the said secured communication channel and wherein said data comprising sensitive information are transmitted among authentication devices mapped to the account of said user, encrypting at least the sensitive information by the authentication device secret, wherein the authentication device secret is known only to the authentication devices which have been mapped to the same user account, and the authentication device secret is not known by other devices or the authentication servers.

2. A method for mapping at least two authentication devices to a user account using an authentication server, comprising the steps of:

connecting each authentication device to the authentication server using a secured communication channel; and mapping said authentication devices to the account of said user on the authentication server, prior to mapping or simultaneously with mapping of the authentication devices to the single user account on the authentication server, a first authentication device transmits a one-time secret to a second authentication device directly, without using the authentication server, and subsequently transmitting an authentication device secret, encrypted using the one-time secret, from the first authentication device to the authentication server using a secured communication channel and from the authentication server to the second authentication device, and the second authentication device decrypts the authentication device secret using the one-time secret, and stores the authentication device secret on the second authentication device wherein, if the mapping is the first mapping of another authentication device, the first authentication device generates the authentication device secret and a first authentication device transmits the authentication device secret stored on the first authentication device to said another authentication device at each following mapping of another authentication device, during any transfer of data between the authentication devices mapped to the account of said user, transmitting the data from a first authentication device to the authentication server using a secured communication channel and transmitting said data from the authentication server to another authentication device mapped to the account of said user using a secured communication channel when the other authentication device creates the said secured communication channel and wherein said data comprising sensitive information are transmitted among authentication devices mapped to the account of said user, encrypting at least the sensitive information by the authentication device secret, wherein the authentication device secret is known only to the authentication devices which have been mapped to the same user account, and the authentication device secret is not known by other devices or the authentication servers.

3. The method according to claim 1, wherein, if a Personal local authentication factor has already been created on the first authentication device then after mapping the authentication devices to the user account, synchronization data are prepared on the first authentication device from a set of information needed for authentication with an authentication server wherein preferably at least sensitive information is encrypted using the authentication device secret; subsequently, a secured communication channel is created between the first authentication device and the second authentication device via the authentication server the synchronization data is transferred through this secured communication channel from the first authentication device to the authentication server and from the authentication server to the second authentication device and the second authentication device preferably decrypts the synchronization data using the authentication device secret.

4. The method according to claim 1, wherein, following the mapping of authentication devices to the user account, when a Personal local authentication factor is created in the first authentication device, synchronization data is prepared in this first authentication device from a set of information needed for authentication with the first authentication server, wherein preferably at least sensitive information is encrypted using the authentication device secret; subsequently, a secured communication channel is created between the first authentication device and the authentication server, the synchronization data is transmitted through this secured communication channel from the first authentication device to the authentication server the synchronization data are queued on the authentication server in a synchronization queue for all the other authentication devices mapped to the same user account, and, for each such authentication device after it logs in, a secured communication channel is created between this authentication device and the authentication server and the contents of the synchronization queue are transferred to this authentication device wherein preferably the synchronization data are decrypted using the authentication device secret.

5. The method according to claim 1, wherein, if a change is made on one authentication device in the set of information needed for use of the Personal local authentication factor and the change is to be transmitted also to the other authentication devices mapped to the same user account, synchronisation data are created on this authentication device, wherein preferably at least the sensitive information is encrypted using the authentication device secret; subsequently, the synchronisation data are transferred, within the nearest following authentication transaction, to at least one authentication server, and then the synchronisation data are transferred during the nearest following authentication transaction with every other authentication device mapped to the same user account to this other authentication device, which preferably decrypts the synchronisation data using the authentication device secret.

6. The method according to claim 1, wherein, authentication of communication using the same Personal local authentication factor with another authentication server is initiated as follows: within the first authentication transaction with this other authentication server the accuracy of the entered personal local authentication factor is first verified with any authentication server where this Personal local authentication factor for authentication has already been created.

7. The method according to claim 6, wherein, subsequently, the authentication device prepares synchronization data for the set of information needed for authentication with said another authentication server, wherein preferably at least the sensitive information is encrypted using the authentication device secret; subsequently, these synchronization data are transmitted via secured communication channels to all authentication servers where this authentication device is mapped to the given user account, into synchronization queues for all authentication devices mapped to the same user account; and, after login of any such authentication device, a secured communication channel is created between this authentication device and the authentication server, and the content of the synchronization queue is transferred to this other authentication device, wherein the synchronization data are preferably decrypted using the authentication device secret.

8. The method according to claim 1, wherein, when a change of the Personal local authentication factor from an original Personal local authentication factor to a new Personal local authentication factor is desired, the change is carried out on one authentication device, wherein on this authentication device the entered value of the original Personal local authentication factor is verified with at least one authentication server on which the Personal local authentication factor has been created; furthermore, synchronisation data are created on this authentication device, wherein preferably at least the sensitive information is encrypted using the authentication device secret; these synchronization data are transmitted via secured communication channels to all authentication servers where this authentication device is mapped to the given user account and where the Personal local authentication factor has been created, into synchronization queues for all authentication devices mapped to the same user account, and, after login of any such authentication device, a secured communication channel is created between this authentication device and the authentication server, and the content of the synchronization queue is transferred to this authentication device, wherein the synchronization data are preferably decrypted using the authentication device secret.

9. The method according to claim 1, wherein, when a merger of multiple Personal local authentication factors into one Personal local authentication factor is desired, all Personal local authentication factors to be merged are entered in an authentication device which possesses sets of information necessary to verify all merged Personal local authentication factors the authentication device verifies each Personal local authentication factor with at least one authentication server on which this Personal local authentication factor has been created, and then replaces all the Personal local authentication factors with one Personal local authentication factor wherein synchronisation data are created on this authentication device wherein preferably at least the sensitive information is encrypted using the authentication device secret; subsequently, these synchronization data are transmitted via secured communication channels to all authentication servers where this authentication device is mapped to the given user account and where the Personal local authentication factor has been created, into synchronization queues for all authentication devices mapped to the same user account, and, after login of any such authentication device, a secured communication channel is created between this authentication device and the authentication server, and the content of the synchronization queue is transferred to this authentication device, wherein the synchronization data are preferably decrypted using the authentication device secret.

10. The method according to claim 3, wherein, when a second authentication device is mapped to the same user account, the second device having a Personal local authentication factor different from the Personal local authentication factor on the first authentication device, and the requirement being that both authentication devices use the same Personal local authentication factor after the mapping, then, after synchronization data from the set of information needed for authentication with the authentication server is transferred from the first authentication device to the other authentication device, the entered values of both Personal local authentication factors are first verified by the second authentication device with at least one authentication server where the respective Personal local authentication factor has been created and, in case of a positive result of this verification, the original Personal local authentication factor created in the second authentication device is replaced by the Personal local authentication factor transferred from the first authentication device.

11. The method according to claim 1, wherein, an authentication device where a request for deletion of a Personal local authentication factor was made deletes the Personal local authentication factor and prepares synchronization data containing information on the deletion of the Personal local authentication factor and transmits it to all authentication servers where this authentication device is mapped to the user account and the Personal local authentication factor has been created, and these servers queue the synchronization data in a synchronization queue for all authentication devices mapped to the same user account; subsequently, following receipt of the synchronization data confirmation of the request for deletion of the personal local authentication factor is requested on all these authentication devices and the Personal local authentication factor on the authentication device is only deleted after the confirmation of the request for deletion of the Personal local authentication factor; in case the request for deletion of the Personal local authentication factor is declined, the accuracy of the Personal local authentication factor is verified, the Personal local authentication factor is not deleted and the access to the authentication device where the request for deletion of the Personal local authentication factor was first made is blocked.

12. The method according to claim 1, wherein, behaviour of a user using the Personal local authentication factor by any authentication device is evaluated every time the Personal local authentication factor is used; preferably, the evaluation is carried out on the basis of the success or failure in placing the Personal local authentication factor on the individual devices.

13. The method according to claim 1, wherein a Personal local authentication factor is created as follows: a secret information shared only by an authentication device and an authentication server is created within an authentication transaction and a reference information is derived from this secret information on the authentication server and the authentication device using the same method on both, and the authentication device creates a transformed reference information by means of a cryptographic transformation from the reference information using as a parameter the Personal local authentication factor chosen and entered by the user or obtained from a medium or from the outer environment, wherein only the reference information is stored on the authentication server and only the transformed reference information is stored on the authentication device.

14. The method according to claim 13, wherein, in each subsequent authentication transaction using the created Personal local authentication factor the authentication device obtains the Personal local authentication factor from the user, a medium or the outer environment; the reference information is derived from the transformed reference information by means of inverse cryptographic transformation using the obtained Personal local authentication factor as a parameter in the authentication device, and the thus obtained reference information is transmitted to the authentication server; preferably, the reference information is transmitted in the form of derived information obtained through application of a one-way cryptographic transformation using authenticated random information shared by the authentication device and the authentication server and valid only for the given authentication transaction on the reference information; subsequently, the authentication server compares the obtained reference information with the reference information stored on the server, or alternatively, the derived information is compared with an information derived using the same one-way cryptographic transformation on the reference information stored on the server.

15. The method according to claim 2, wherein if a Personal local authentication factor has already been created on the first authentication device, then after mapping the authentication devices to the user account, synchronization data are prepared on the first authentication device from a set of information needed for authentication with an authentication server; wherein preferably at least sensitive information is encrypted using the authentication device secret;

subsequently, a secured communication channel is created between the first authentication device and the second authentication device via the authentication server, the synchronization data is transferred through this secured communication channel from the first authentication device to the authentication server, and from the authentication server to the second authentication device and the second authentication device preferably decrypts the synchronization data using the authentication device secret.

16. The method according to claim 2, wherein, following the mapping of authentication devices to the user account, when a Personal local authentication factor is created in the first authentication device, synchronization data is prepared in this first authentication device from a set of information needed for authentication with the first authentication server, wherein preferably at least sensitive information is encrypted using the authentication device secret; subsequently, a secured communication channel is created between the first authentication device and the authentication server, the synchronization data is transmitted through this secured communication channel from the first authentication device to the authentication server the synchronization data are queued on the authentication server in a synchronization queue for all the other authentication devices mapped to the same user account, and, for each such authentication device, after it logs in, a secured communication channel is created between this authentication device and the authentication server and the contents of the synchronization queue are transferred to this authentication device, wherein preferably the synchronization data are decrypted using the authentication device secret.

17. The method according to claim 2, wherein if a change is made on one authentication device in the set of information needed for use of the Personal local authentication factor and the change is to be transmitted also to the other authentication devices—mapped to the same user account, synchronisation data are created on this authentication device, wherein preferably at least the sensitive information is encrypted using the authentication device secret; subsequently, the synchronisation data are transferred, within the nearest following authentication transaction, to at least one authentication server, and then the synchronisation data are transferred during the nearest following authentication transaction with every other authentication device mapped to the same user account to this other authentication device, which preferably decrypts the synchronisation data using the authentication device secret.

18. The method according to claim 2, wherein authentication of communication using the same Personal local authentication factor with another authentication server is initiated as follows: within the first authentication transaction with this other authentication server, the accuracy of the entered personal local authentication factor is first verified with any authentication server where this Personal local authentication factor for authentication has already been created.

19. The method according to claim 18, wherein, subsequently, the authentication device prepares synchronization data for the set of information needed for authentication with said another authentication server, wherein preferably at least the sensitive information is encrypted using the authentication device secret; subsequently, these synchronization data are transmitted via secured communication channels to all authentication servers where this authentication device is mapped to the given user account, into synchronization queues for all authentication devices mapped to the same user account; and, after login of any such authentication device, a secured communication channel is created between this authentication device and the authentication server, and the content of the synchronization queue is transferred to this other authentication device, wherein the synchronization data are preferably decrypted using the authentication device secret.

20. The method according to claim 2, wherein when a change of the Personal local authentication factor from an original Personal local authentication factor to a new Personal local authentication factor is desired, the change is carried out on one authentication device, wherein on this authentication device the entered value of the original Personal local authentication factor is verified with at least one authentication server on which the Personal local authentication factor has been created; furthermore, synchronisation data are created on this authentication device, wherein preferably at least the sensitive information is encrypted using the authentication device secret; these synchronization data are transmitted via secured communication channels to all authentication servers where this authentication device is mapped to the given user account and where the Personal local authentication factor has been created, into synchronization queues for all authentication devices mapped to the same user account, and, after login of any such authentication device, a secured communication channel is created between this authentication device and the authentication server and the content of the synchronization queue is transferred to this authentication device wherein the synchronization data are preferably decrypted using the authentication device secret.

21. The method according to claim 2, wherein when a merger of multiple Personal local authentication factors into one Personal local authentication factor is desired, all Personal local authentication factors to be merged are entered in an authentication device which possesses sets of information necessary to verify all merged Personal local authentication factors, the authentication device verifies each Personal local authentication factor with at least one authentication server on which this Personal local authentication factor has been created, and then replaces all the Personal local authentication factors with one Personal local authentication factor wherein synchronisation data are created on this authentication device, wherein preferably at least the sensitive information is encrypted using the authentication device secret; subsequently, these synchronization data are transmitted via secured communication channels to all authentication servers where this authentication device is mapped to the given user account and where the Personal local authentication factor has been created, into synchronization queues for all authentication devices mapped to the same user account, and, after login of any such authentication device, a secured communication channel is created between this authentication device and the authentication server and the content of the synchronization queue is transferred to this authentication device, wherein the synchronization data are preferably decrypted using the authentication device secret.

22. The method according to claim 15, characterised in that when a second authentication device is mapped to the same user account, the second device having a Personal local authentication factor different from the Personal local authentication factor on the first authentication device, and the requirement being that both authentication devices use the same Personal local authentication factor after the mapping, then, after synchronization data from the set of information needed for authentication with the authentication server is transferred from the first authentication device to the other authentication device, the entered values of both Personal local authentication factors are first verified by the second authentication device with at least one authentication server where the respective Personal local authentication factor has been created and, in case of a positive result of this verification, the original Personal local authentication factor created in the second authentication device is replaced by the Personal local authentication factor transferred from the first authentication device.

23. The method according to claim 2, wherein an authentication device where a request for deletion of a Personal local authentication factor was made deletes the Personal local authentication factor and prepares synchronization data containing information on the deletion of the Personal local authentication factor and transmits it to all authentication servers where this authentication device is mapped to the user account and the Personal local authentication factor has been created, and these servers queue the synchronization data in a synchronization queue for all authentication devices mapped to the same user account;

subsequently, following receipt of the synchronization data, confirmation of the request for deletion of the personal local authentication factor is requested on all these authentication devices, and the Personal local authentication factor on the authentication device is only deleted after the confirmation of the request for deletion of the Personal local authentication factor; in case the request for deletion of the Personal local authentication factor is declined, the accuracy of the Personal local authentication factor is verified, the Personal local authentication factor is not deleted and the access to the authentication device where the request for deletion of the Personal local authentication factor was first made is blocked.

24. The method according to claim 2, wherein behaviour of a user using the Personal local authentication factor by any authentication device is evaluated every time the Personal local authentication factor is used; preferably, the evaluation is carried out on the basis of the success or failure in placing the Personal local authentication factor on the individual devices.

25. The method according to claim 2, wherein a Personal local authentication factor is created as follows: a secret information shared only by an authentication device and an authentication server is created within an authentication transaction and a reference information is derived from this secret information on the authentication server and the authentication device, using the same method on both, and the authentication device creates a transformed reference information by means of a cryptographic transformation from the reference information using as a parameter the Personal local authentication factor chosen and entered by the user or obtained from a medium or from the outer environment, wherein only the reference information is stored on the authentication server and only the transformed reference information is stored on the authentication device.

26. The method according to claim 25, wherein in each subsequent authentication transaction using the created Personal local authentication factor the authentication device obtains the Personal local authentication factor from the user, a medium or the outer environment; the reference information is derived from the transformed reference information by means of inverse cryptographic transformation using the obtained Personal local authentication factor as a parameter in the authentication device and the thus obtained reference information is transmitted to the authentication server preferably, the reference information is transmitted in the form of derived information obtained through application of a one-way cryptographic transformation using authenticated random information shared by the authentication device and the authentication server and valid only for the given authentication transaction on the reference information; subsequently, the authentication server compares the obtained reference information with the reference information stored on the server, or alternatively, the derived information is compared with an information derived using the same one-way cryptographic transformation on the reference information stored on the server.

* * * * *